United States Patent [19]

Hatase et al.

[11] Patent Number: 4,825,237
[45] Date of Patent: Apr. 25, 1989

[54] AUTOMATIC FOCUSING DEVICE FOR USE IN A CAMERA

[75] Inventors: Takayuki Hatase, Yokohama; Yoshimi Ohno, Kawasaki, both of Japan

[73] Assignee: Ricoh Company Ltd., Tokyo, Japan

[21] Appl. No.: 169,470

[22] Filed: Mar. 17, 1988

[30] Foreign Application Priority Data

| Mar. 18, 1987 | [JP] | Japan | 62-61341 |
| Mar. 18, 1987 | [JP] | Japan | 62-61342 |
| May 1, 1987 | [JP] | Japan | 62-106210 |
| May 28, 1987 | [JP] | Japan | 62-129810 |
| May 30, 1987 | [JP] | Japan | 62-133403 |

[51] Int. Cl.⁴ .......................... G03B 3/10; G03B 5/00; G03B 13/18; G03B 15/22
[52] U.S. Cl. .................... 354/402; 354/409; 354/195.12; 350/430
[58] Field of Search ............ 354/400, 402, 409, 195.1, 354/195.12, 195.13; 350/430, 255

[56] References Cited

U.S. PATENT DOCUMENTS 4,609,260 9/1986 Kawai .................. 350/430
4,774,540 9/1988 Taniguchi et al. .................. 354/402

FOREIGN PATENT DOCUMENTS 168022 10/1983 Japan .................. 350/430

Primary Examiner—W. B. Perkey
Attorney, Agent, or Firm—Oblon, Fisher, Spivak, McClelland & Maier

[57] ABSTRACT

An automatic focusing device for use in a camera using photographic lenses having a variable power region in which an entire focal length of a variable power optical system comprising a variable power lens group, a focusing lens group and a macro lens group disposed on an identical optical axis can optionally be set by the variable power lens group between a shortest focal length and a longest focal length, a macro region capable of macro photographing by the macro lens group, a variable power focusing region from an infinite position to a nearest position on the optical axis corresponding to an object distance from an infinite distance to a nearest distance and a macro focusing region capable of macro photographing in a predetermined region disposed from a nearest position on a side opposite to an infinite position.

5 Claims, 19 Drawing Sheets

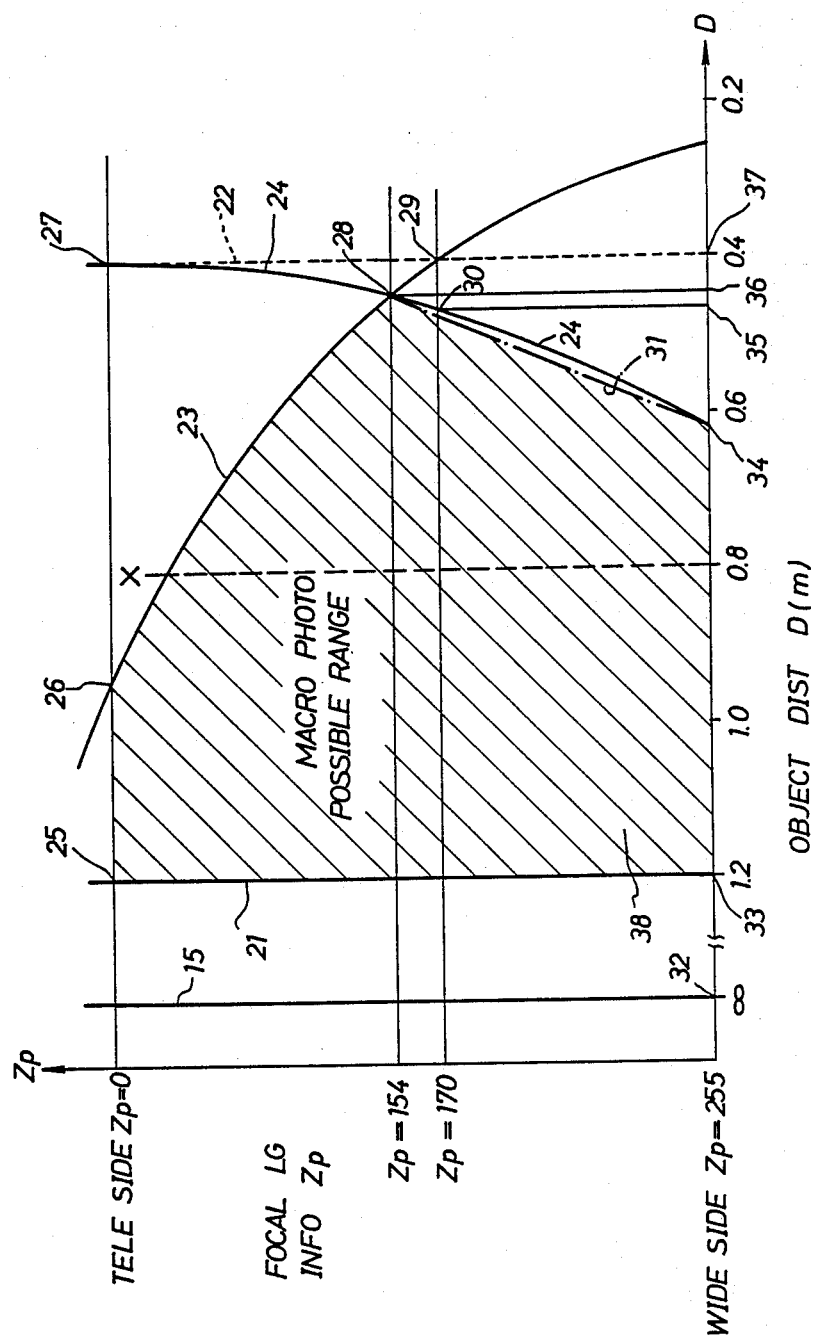

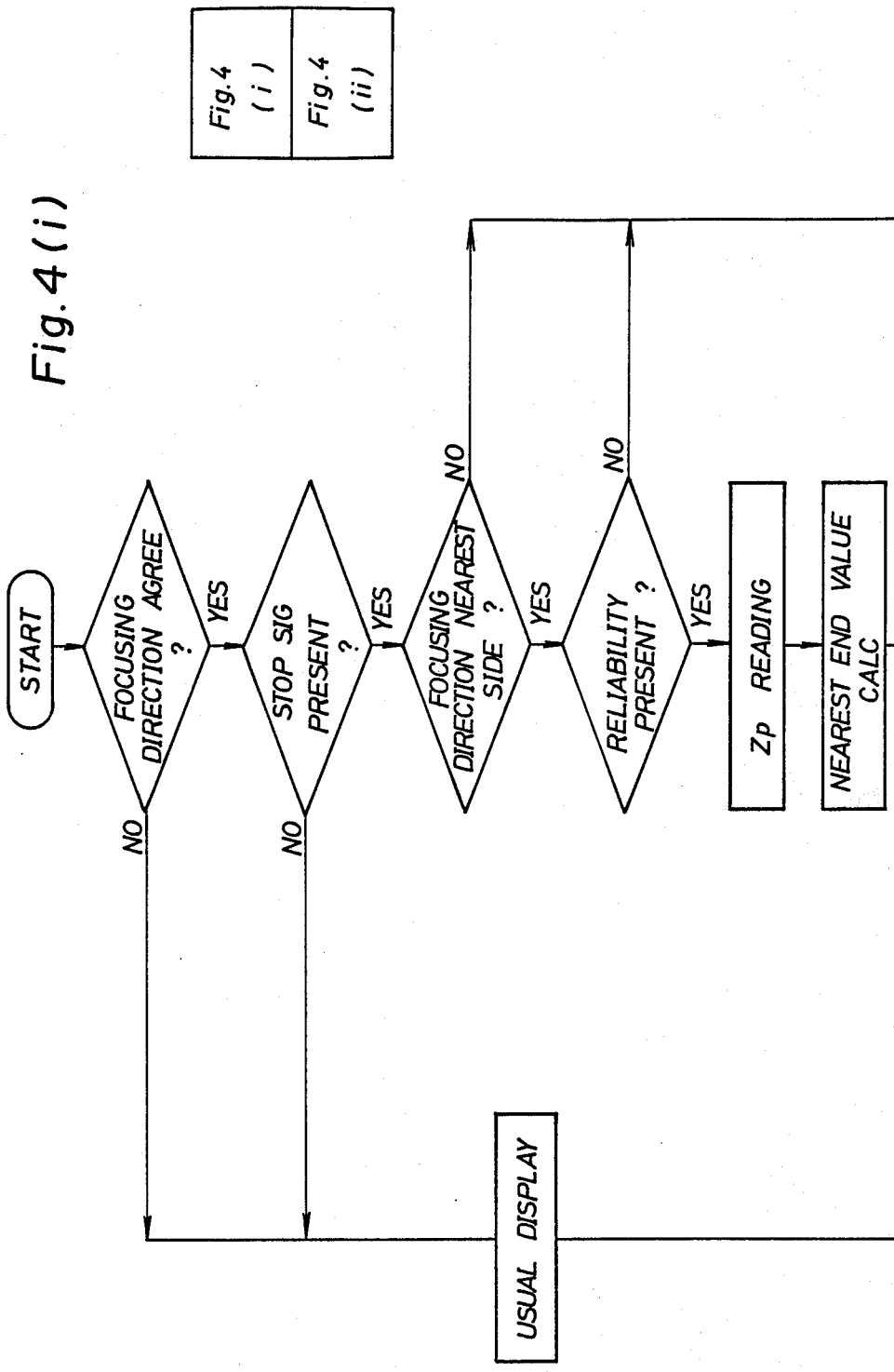

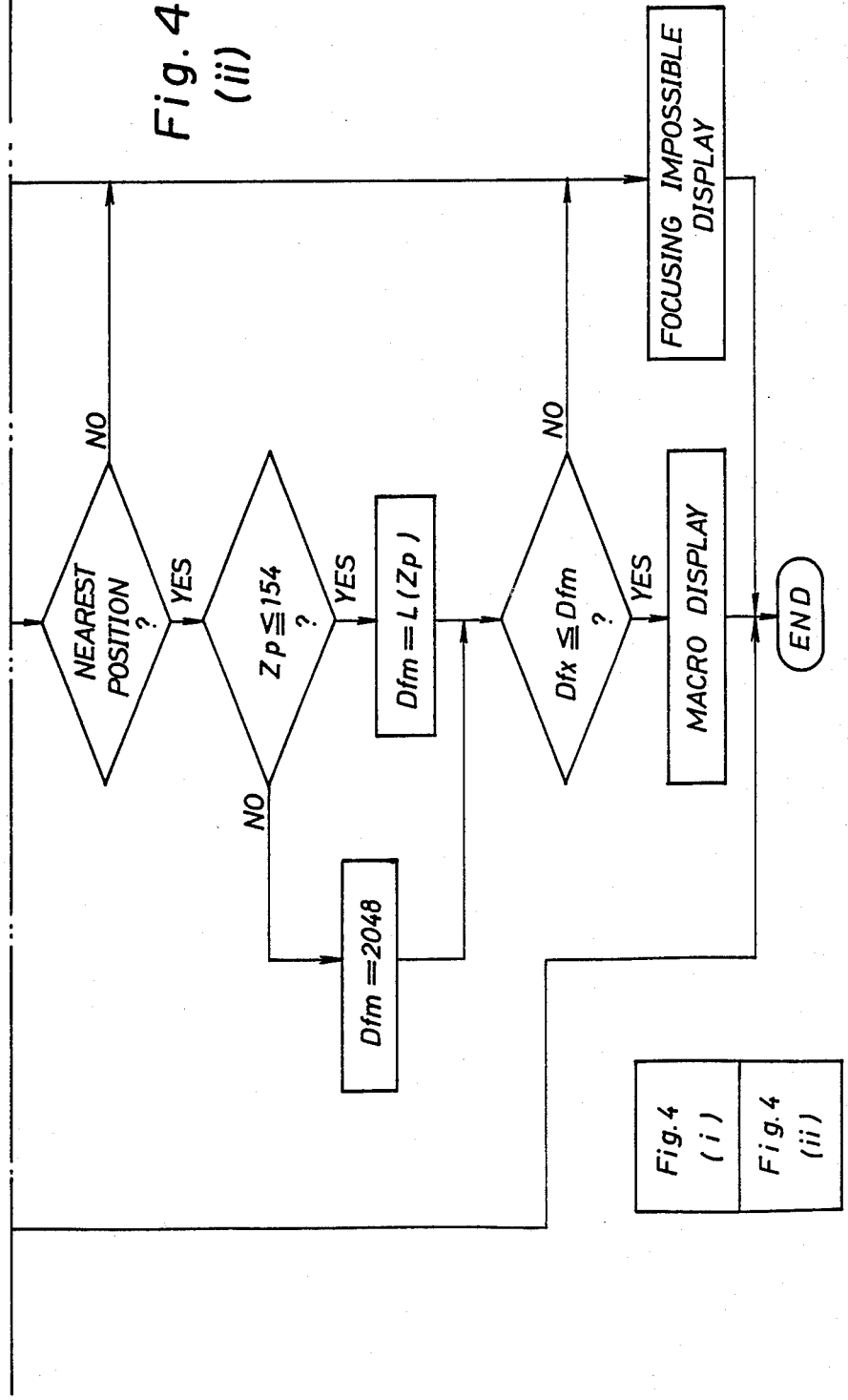

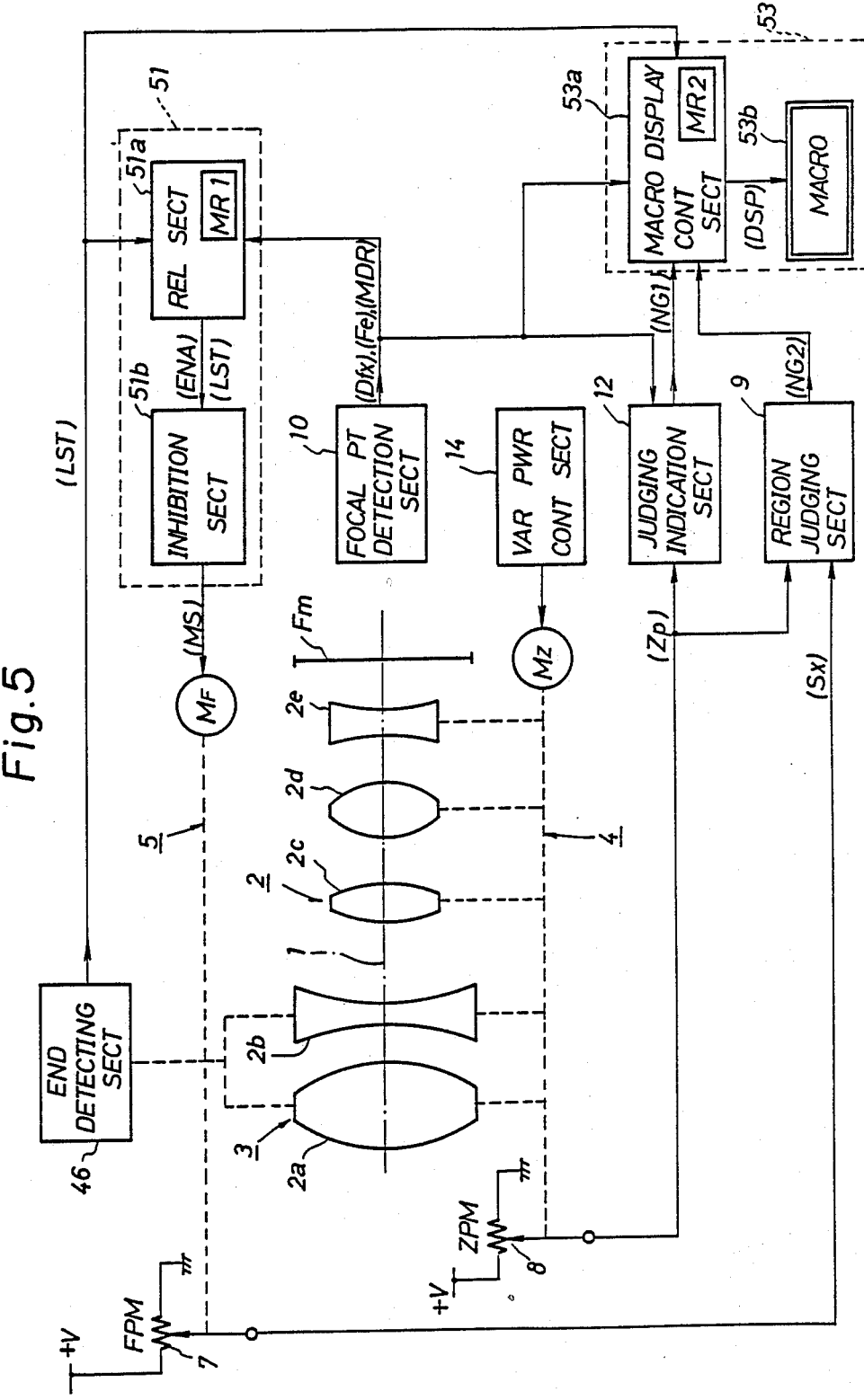

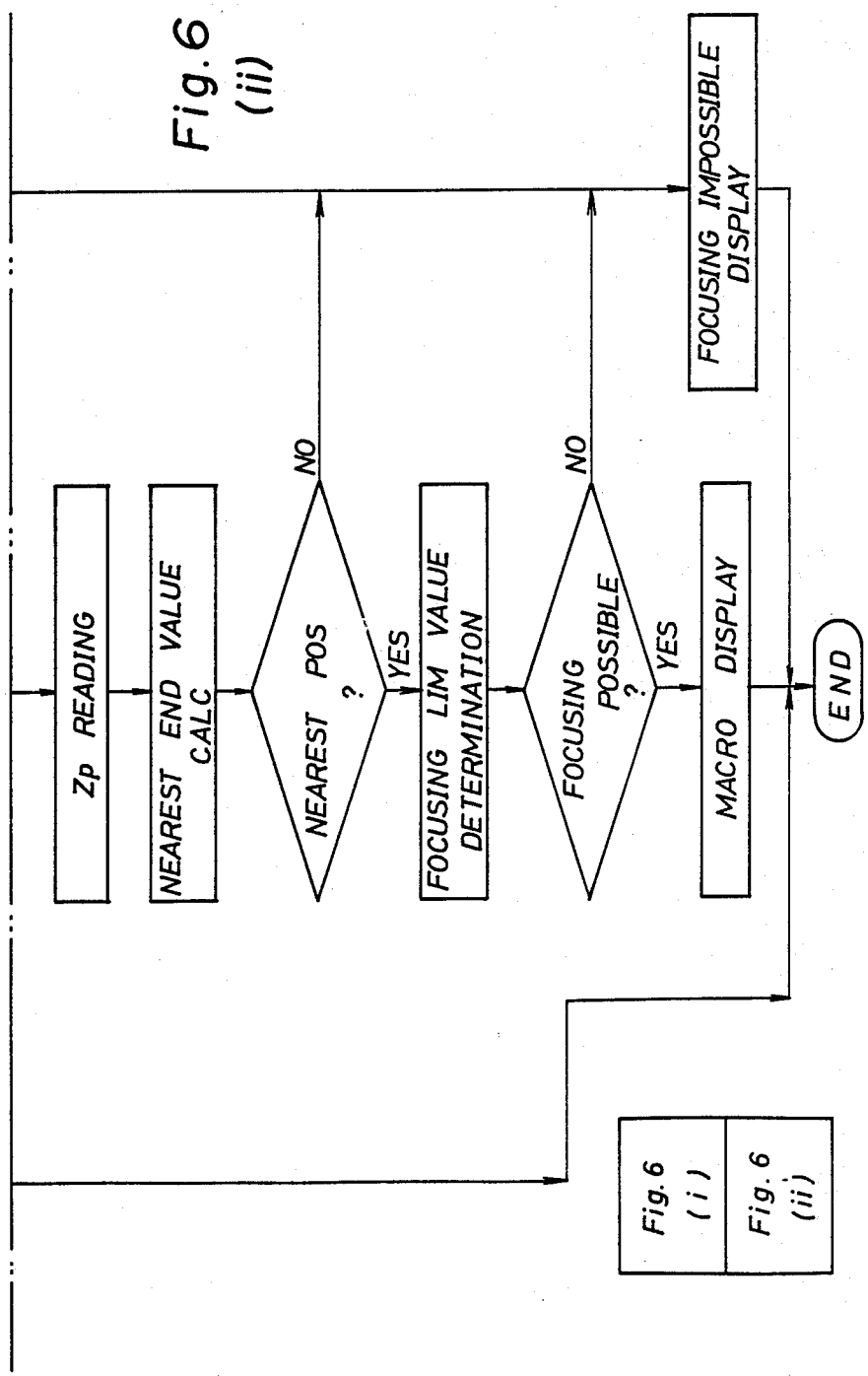

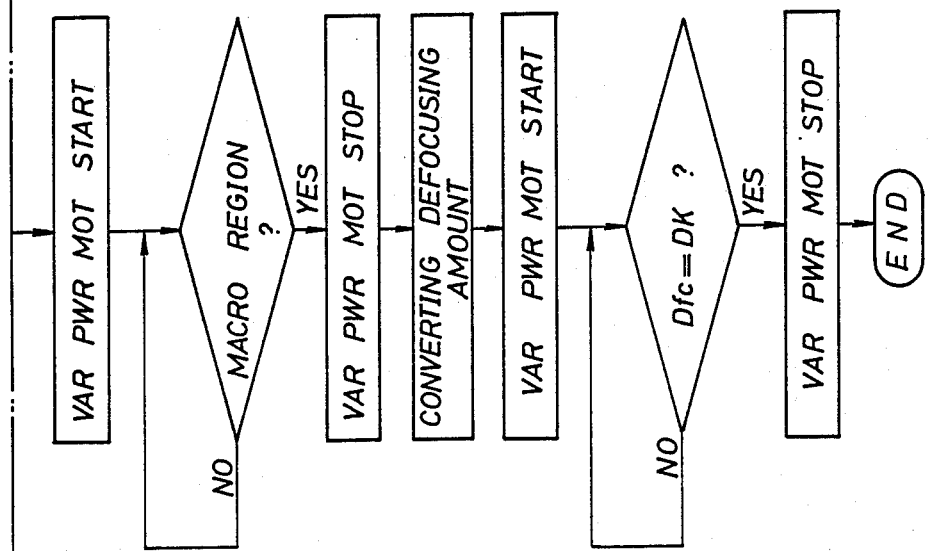

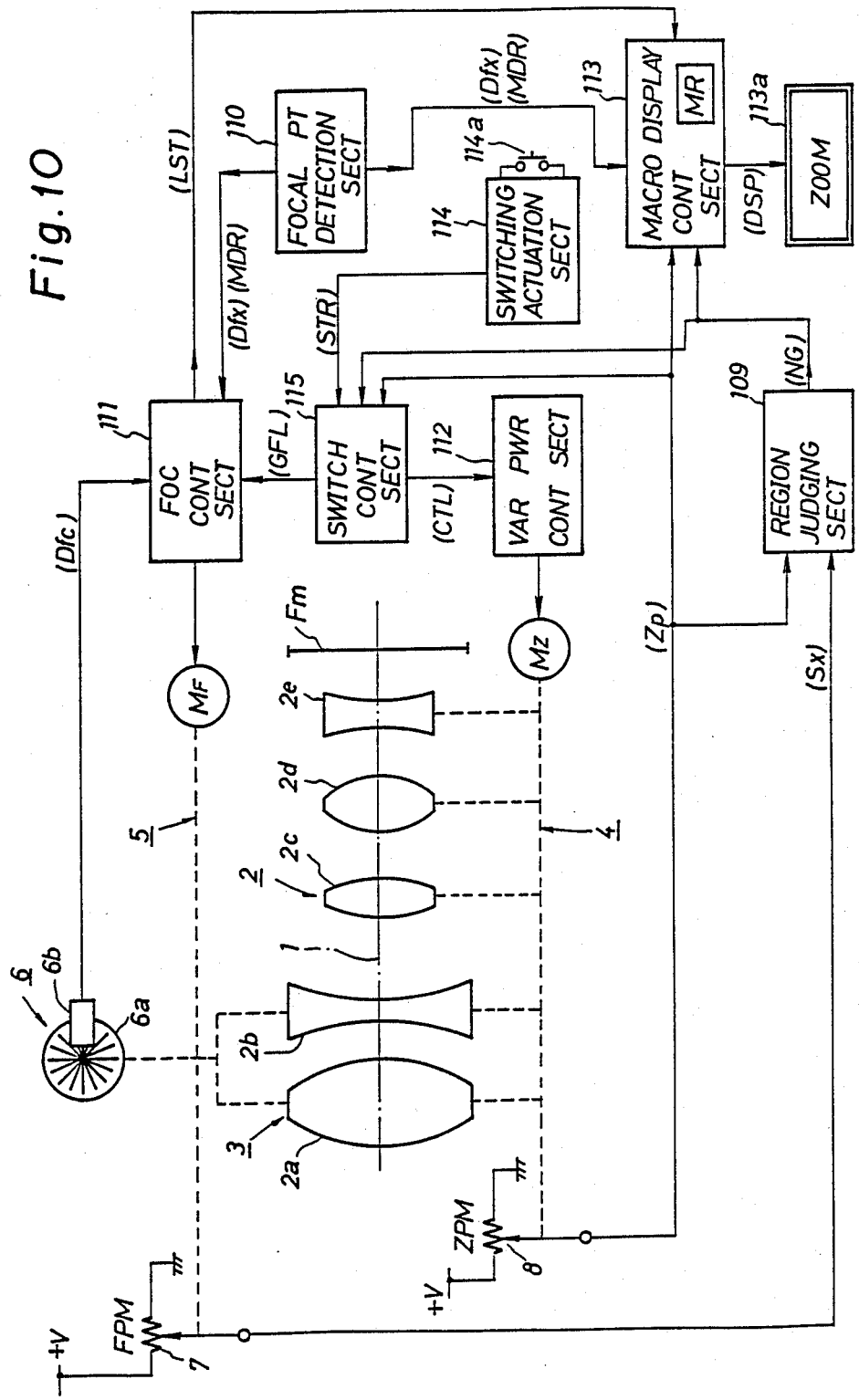

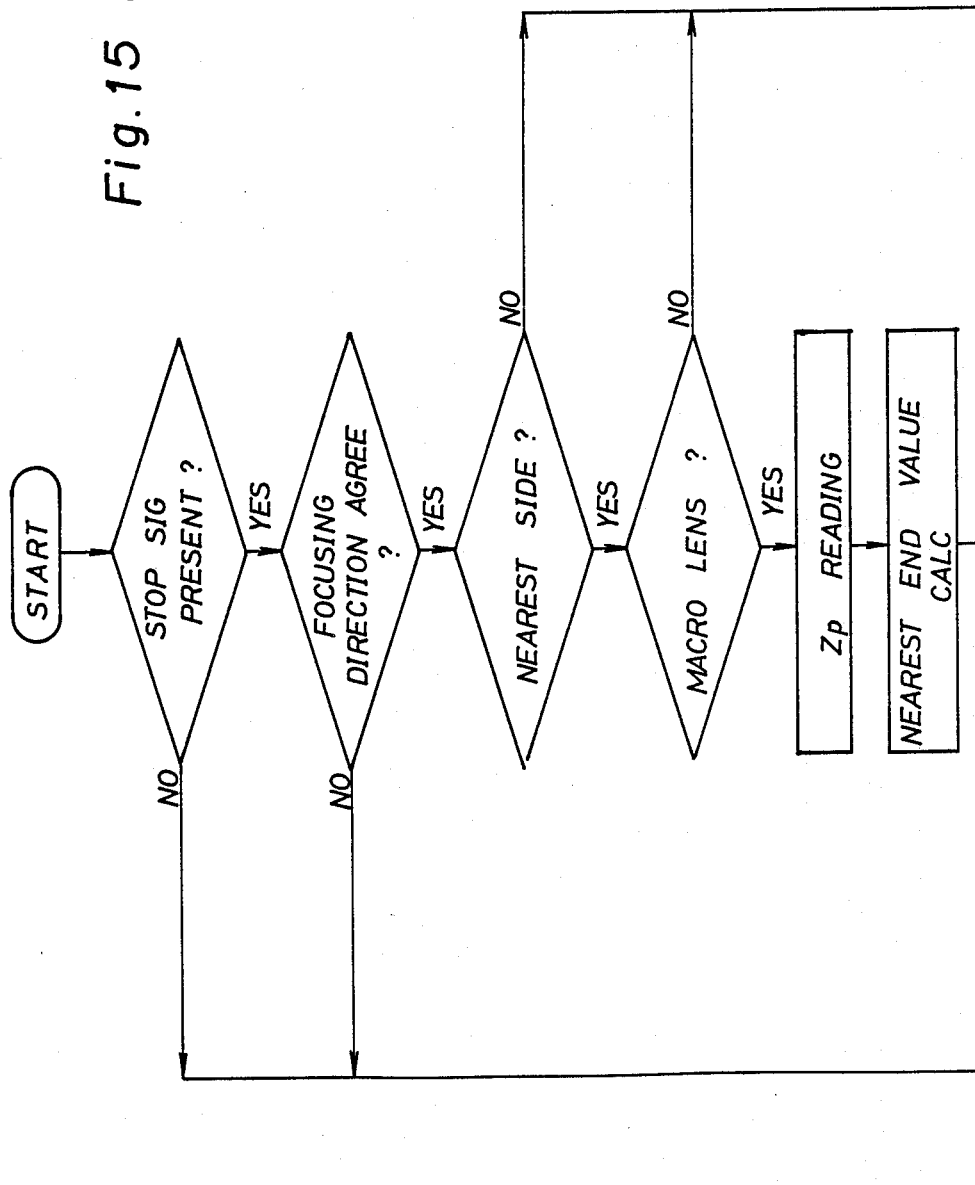

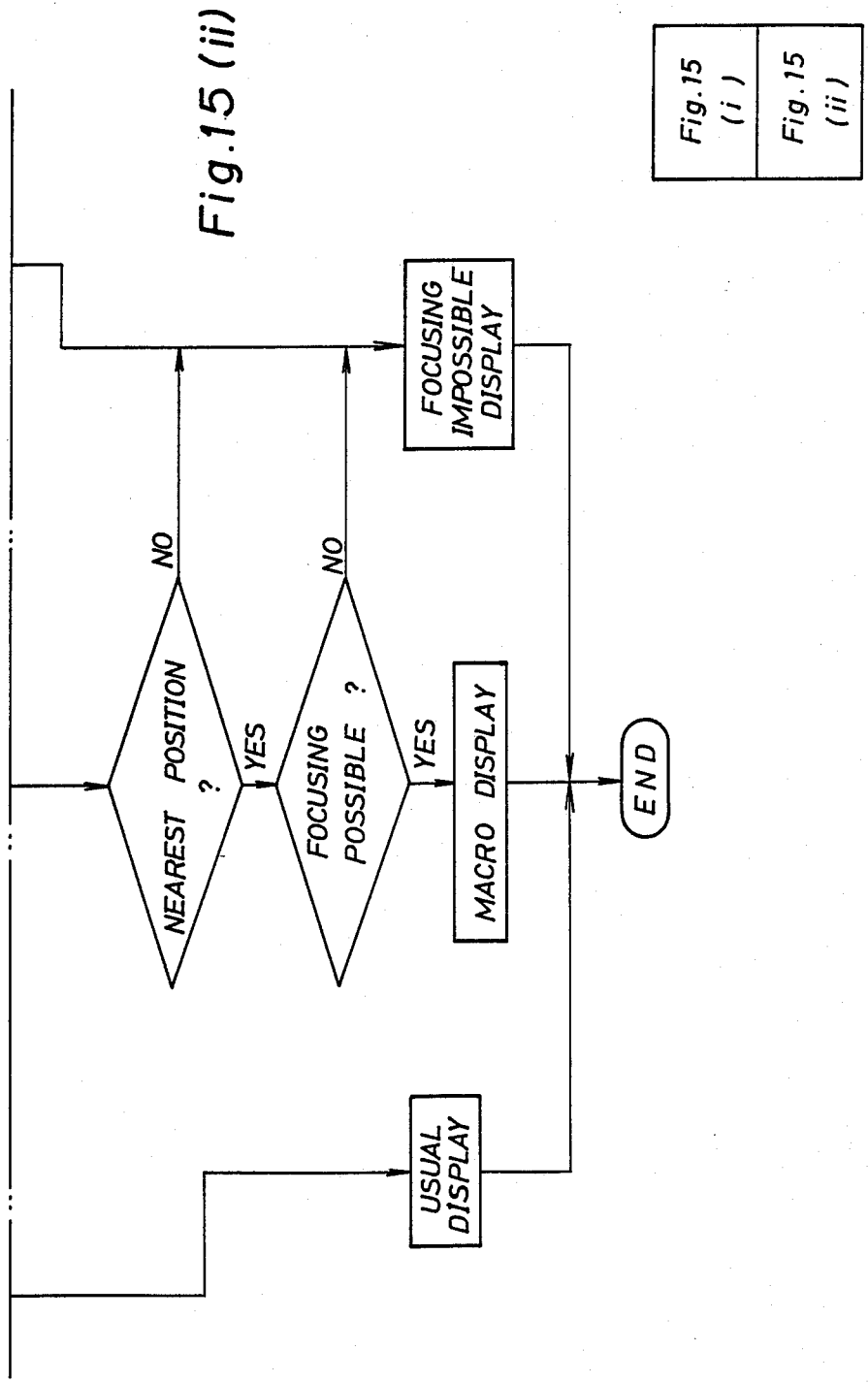

AUTOMATIC FOCUSING DEVICE FOR USE IN A CAMERA

BACKGROUND OF THE INVENTION

The present invention concerns an automatic focusing device for use in a camera. Automatic operation for cameras has been developed along with introduction of electronic constitutions into cameras in recent years. Particularly, cameras having an automatic focusing device for automatically conducting the focusing operation are very much convenient since photographs can be taken at high quality without so-called "out of focus" even by those persons having no particular technical knowledges and not trained specially, by a simple operation of directing a camera to an object and pushing a release button.

While on the other hand, there has also been made generally to assemble the automatic focusing device into a camera provided or detachably mounted with a zoom lens or a variable focus lens having such a wide variable focal length region that the focal length is variable, for example, from 35 mm to 135 mm by one lens set without exchanging several lenses of different focal lengths. The shortest object distance capable of taking photograph in such a camera (hereinafter simply referred to as "nearest distance") is often set to about 1 m although it is different depending on the lens focal length. That is, it is possible to take photograph over a wide range of 35 mm–135 mm as the focal length and about from 1 m to infinite distance (hereinafter simply referred to as "∞"), as the object distance.

Further, there is also a lens (camera) capable of macro photographing that can take a photograph even for an object at a distance nearer than the nearest distance (about 1 m) described above without exchanging the lenses, in addition to such a wide photographing range described above.

A distance measuring section is disposed as one of the components of the automatic focusing device for measuring the object distance. Various methods have already been proposed for the distance measurement conducted in the distance measuring section and they can include, for example, a method of recognizing an intended focused position by detecting the defocusing amount on the film surface (the extent for the deviation of the focused position), called as a correlationship method, which uses a charge coupled device, that is, a known solid state image pick-up device (hiereinafter simply referred to as "CCD") as the photoreceiving element for detecting the defocusing amount.

By the way, in a camera having the automatic focusing device incorporated therein and a lens system having the variable power function and the macro function mounted thereto, it is necessary for the judgement as to whether the lens system should be switched to the macro region or not in a case where the focused state can not be obtained even after the lens system has reached the end at the nearest position in the variable power region. That is, some information has to be provided to a camera operator.

However, in a camera comprising a lens system having the foregoing function and the automatic focusing device, since not only the object distance relative to an identical defocusing amount varies but also the errors in the detection section and the calculating section are different depending on the setting state (mm) for the entire focal length of the lens system (mm) upon arriving (stopping) at the nearest end position, it can not be judged as to whether the focused state is obtainable or not by the switching to the macro region only based on the distance measuring data from the distance measuring section. Accordingly, the camera operator can not cope at all with such situation as described above since the inside state of the camera is quite unknown. In view of the above, it has been taken such a conventional means as indicating only the direction where the focusing possibility is present, for example, by as arrow display, although it can not ensure the actual possibility for the focusing (photographing).

However, in the conventional device of this kind, photographing is not always possible since there is no guarantee for attaining the focused state if the lens system is switched to the macro region and there is even a risk of losing a valuable shutter chance while conducting such wasteful switch operations. Even in a case where there is no such risk, operator will be disappointed and feel displeased. Further, there has also been a problem that the time is consumed wastefully since no appropriate countermeasures can be taken.

In the automatic focusing device as described above, in a case where the focusing lens is driven to the end position on the closest side and yet the focused state is not judged, since the movement of the focusing lens is mechanically stopped at the end, overload is continuously exerted undesirably on the driving means such as a motor. In view of the above, it has generally been adapted that a normally open type switch, for example, is disposed at the end position to detect the arrival of the focusing lens when it reaches the end position and closes the normal open type switch, or a rotary encoder or the like is connected with the focus lens to detect the arrival at the end position if the output pulses from the rotary encoder does not change for a predetermined of time, to thereby stop the driving for the focusing lens automatically hereinafter.

However, there is a scattering in the detection output from the focal point detection means and an erroneous information indicating as if an object to be focused were at a position out of the focusing distance should be outputted temporarily even if the object is at the position near the shortest photographing distance or the infinite distance within the photographing distance range. For instance, in a case where the object to be focused is at the position near the shortest photographing distance, the focusing lens is driven and arrives at the closest end position by such a temporal erroneous information as described above, and the focusing lens is no more driven by the end detection. That is, there has been such a drawback that although the focusing object lies within a photographic distance range capable of focal point adjustment, no proper focal point adjustment can be conducted. The same disadvantage as described above may also occur at the end position of the infinite distance in a case where the focal point detection device is constituted so as to stop the driving for the focusing lens in the infinite end position.

For overcoming such disadvantages, Japanese Patent Laid-Open No. Sho 49-204813 discloses an automatic focal point adjusting device in which the driving for the focusing lens is once stopped when the end detection is made and then the final driving mode for the focusing lens is determined depending on the result of comparison between the data for the deviating directions obtained from the focal point detection means at the instance before or after the thereof.

However, in a case where an object to be focused is focusable in the macro region, in a photographing lens having the macro function, if the photographing lens is not situated within the macro region, the driving control to the focusing lens after the end detection is not made at all by the end detection in the conventional example described above. That is, there occurs a disadvantage that no appropriate focal point adjustment can be made will all that the object to be focused is within the photographing distance range capable of adjusting the focal point.

Further, Japanese Patent Laid-Open No. Sho 58-105113 proposes a lens control device in which the end detection for a lens is conducted if there is no change in the signal relevant to the shifting of the lens for a predetermined of time, and a further movement of the lens in the identical direction is inhibited. However, the conventional device of the latter type also provides a similar disadvantage to that in the device described above.

Further, the respective movements of the lens groups in a camera incorporating the automatic focusing device and having the variable power function and the macro function as described above include the movement due to the focus adjusting operation (hereinafter simply referred to as "focusing movement"), and movement due to the setting operation to the focal length and the setting operation to the variable power region or to the macro region (hereinafter simply referred to as the "setting movement"), and some lens group has to move in dual mode. Then, the moving amount for each of the lens groups in the focusing movement and the setting movement is specifically regulated by the shape of the cam diagram (cam groove) defined upon design of the photographing lens.

While on the other hand, as the structure of the camera has been made more and more compact, there is a demand that protruding portions should be decreased as much as possible in a state where the camera is not used. In view of the above, in a case where a variable focus lens of a large projecting amount is used as the photographing lens, it is considered to dispose a containing region for retracting the protruded portion of the photographing lens as well as the variable power region and the macro region to the inside of the camera main body to the above-mentioned cam diagram (cam groove). In this case, these three regions are connected in series by means of one cam groove in one lens group. Accordingly, if the lens group comprises 5-group of photographing lenses, five stripes of cam grooves are present at least for the setting movement. Further, a portion of the five groups, for example, two lens groups conduct the focusing movement and they undergo dual movement, that is, driven by independent driving systems respectively, by which the moving mode of the lens groups is complicated. As a result, it may be considered such a case where the setting movement, for example, of switching the photographing lens from the variable power region to the macro region may cause interference between the adjacent moving frames depending on the way of constituting each of lens groups and can not be conducted smoothly.

While on the other hand, the focusing movement range (region) described above includes a variable power focusing region and a macro focusing region corresponding to the variable power region and the macro region respectively. For instance, expressing by the object distance, the range from ∞ (infinity distance) to 1.2 m is the variable power focusing region and the succeeding range from 1.2 m to 0.5 m corresponds to the macro focusing region. In the variable power region, when the focusing lens group is moved from the ∞ position to the nearest position between the ∞ position and the, nearest position on the optical axis corresponding to the object distance: ∞–1.2 m, if the moving direction is assumed as positive, since the automatic focusing mechanism is constituted by setting the operation in the variable power focusing region as the standard, the variable power focusing region and the macro focusing region agree with each other. Upon moving in the positive direction also in the macro focusing region, the position on the optical axis corresponding to the object distance 1.2 m corresponds to the ∞ position (hereinafter simply referred to as "MACRO ∞ position"), while the closest position on the optical axis corresponding to the object distance 0.5 m corresponds to the nearest position in view of the automatic focusing mechanism. However, the change of the object distance is continuous from the variable focusing region to the macro focusing region, that is, from ∞ to 0.5 m. Now, assuming that the focusing lens group is at a position on the optical axis corresponding to the object distance 1.2 m and the photographing lens is set to the variable power region, the optical focusing lens group considered to be set at the nearest position in view of the automatic focusing mechanism. However, if the setting to the photographing lens is switched from the variable power region to the macro region while maintaining the position of the focusing lens group as it is (that is, under the state not operating the focusing driving means), the position of the focusing lens group is switched to the closest position corresponding to the object distance 0.5 m in view of the automatic focusing mechanism. That is, although the physical position of the focusing lens group is not varied, switching for the setting of the focusing lens region results in the disagreement for the position of the focusing lens group in view of the automatic focusing mechanism, to thereby bring about a disadvantage in view of the focusing.

Further, the defocusing amount of the actual focused position of the object relative to an intended focused position is different between the variable power focusing region and macro focusing region, and the automatic focusing control in the variable power focusing region can not be applied as it is to the automatic focusing control in the macro focusing region. This constitutes one of the factors inhibiting the attainment of the automatic focusing in the case of using the photographing lenses of this kind.

By the way, in a photographing lens in which the variable range of the focal length in the variable power region is, for example, from 135 mm as the longest focal length (hereinafter referred to as "TELE side") to 35 mm as the shortest focal length (hereafter referred to as "WIDE side"), a predetermined focal length in the macro region is 80 mm and cam grooves determining the movement (moving amount) for each of the lens groups in these regions are in continuous from the TELE side to the macro region, the each of the lens groups moves upon switching the photographing lens in the order of 80 mm of the macro region →135 mm of the variable power region. Then. it is generally adapted such that the driving for each of the lens groups is stopped when reaching 135 mm (TELE side end) of the variable power region. However, the distance measuring data from the distance measuring section contain a scattering even for an identical object distance and, since the focal depth is shallow particularly on the TELE side, it may cause erroneous information by such scattering, for example, that the distance measuring data for an object situated at the object distance 1.2 m corresponding to the nearest side end is indicated as 1.3 m or as 1.0 m on the side of the macro focusing region corresponding to the macro region. Then, if the distance measuring data as the erroneous information is 1.0 m, the control section in the camera judges it as macro photographing possible to display the macro photographing possible direction as described above and maintain this state till the operator actuates the changing switch. That is, there is a problem that the operator is confused upon the demand of returning again to the macro region even after he has once switched from the macro region to the variable power region.

While on the other hand, although each of the lens groups is moved accompanying the switching from the macro region to the variable power region in the order as described above, this movement is actually an instantaneous movement to bring about a visual sense to human eyes as if the view of angle corresponding to 80 mm is directly changed to that corresponding to 135 mm, which gives unnatural sense.

In addition, it may be considered for such a case where each of the lens groups is not stopped on the TELE side but on the WIDE side after passing through the TELE side. In this case, since the focal depth is deep on the WIDE side, if there is any scattering in the distance measuring data as described above, such a scattering is absorbed within the focal depth and cause no erroneous operation. Accordingly, although the problem of confusing the operator can be solved, the change of the angle of view sensed by the human eye is still 80 mm in the macro region—35 mm in the variable power region and, thus, the unnatural feeling is not eliminated.

The first object of the present invention is to provide an automatic focusing device for use in a camera capable of previously judging as to if the macro photographing is possible or not correctly while the variable power lens group is in the variable power region and capable of displaying an operation demand information for calling the operator's attention to appropriate procedures if it is in the possible state, thereby enabling easy and rapid operation.

The second object of the present invention is to provide an automatic focus adjusting device capable of preventing an overload from being exerted on driving means and suppressing wasteful consumption of electrical power when the focusing lens of photographing lenses is driven to the end of the driving range in the variable power region and stops there, by inhibiting the successive driving to the identical direction, capable of highly accurate focusing adjustment even if the output of the focal point detection means should vary by allowing the driving in the opposite direction and, further, capable of providing an user with appropriate information as to whether the macro photographing is possible or not in a case where the object to be focused is at a distance nearer than the nearest distance in the variable power region.

The third object of the present invention is to provide an automatic focusing device for use in a camera capable of using an automatic focusing mechanisms in common both in the variable power region and in the macro region by moving each of lens groups constituting a variable power optical system smoothly with no interference to each other upon switching operation for the region of the photographing lens from the variable power region to the macro region or, vice versa, and further unifying the direction of the focusing lens group after the switching operation.

The fourth object of the present invention is to provide a variable power optical system control device for use in a camera capable of smoothly switching without giving confusion to an operator upon switching the setting for the variable power optical system from the macro region to the variable power region with an inexpensive and simple structure and capable of eliminating the change of angle of view sensed by human eyes from a practical point of view.

The fifth object of the present invention is to provide an automatic focusing device for use in a camera capable of judging as to whether the mounted photographing lenses have the macro function or not, previously judging as to whether the macro photographing is possible or not correctly in a state where the variable power lens group is in the variable power region and if it has the macro function, displaying a demand information for calling the user's attention to appropriate procedures if it is in the possible state, thereby enabling easy and rapid operation.

The present invention provides an automatic focusing device for use in a camera using photographic lenses having a variable power region in which an entire focal length of a variable power optical system comprising a variable power lens group, a focusing lens group and a macro lens group disposed on an identical optical axis can optionally be set by the variable power lens group between a shortest focal length and a longest focal length and a macro region capable of macro photographing by the macro lens group, as well as having, as a focusing region of the focusing lens group, a variable power focusing region from an infinite position to a nearest position on the optical axis corresponding to an object distance from an infinite distance to a nearest distance and a macro focusing region capable of macro photographing in a predetermined region disposed from the nearest position on the side opposite to the infinite position, the device comprising a focal point detection means for receiving light from an object transmitting through the photographic lenses and detecting a defocusing direction and the defocusing amount for a focused position of an object relative to an intended focal point position, a region judging means for judging as to whether the variable power optical system is in the variable power region or in the macro region, a focal length detection means for outputting a focal length information corresponding to an entire system focal length when the variable power lens group is in the variable power region, a focusing drive control means for driving the focusing lens group, detecting that the focusing lens group has been driven to end of the variable power focusing region and then stopping a driving for the focusing lens group, a macro information providing means for providing a camera operator with an operation promotion information so that the variable power optical system is shifted to a macro photographing possible state when the focusing lens group is driven to end in the variable power focusing region, the defocusing directions just before the driving is stopped or just after the driving is stopped by the focusing drive control means respectively are identical with each other and the defocusing direction is directed to the nearest position and a judging indication means for calculating a macro photographing possible range to the entire system focal length set a focal length information and the defocusing amount, judging as to whether the operation promotion information should be provided or not and then indicating this to the macro information providing means.

In the automatic focusing device for use in a camera according to the present invention, it is judged as to whether an object at a distance nearer than the nearest distance can be photographed in the macro region or not properly and at a high accuracy and, if it is judged that the photographing is possible, the operation demand information calling the operator's attention to the operation of shifting to the macro region is informed. Accordingly, it is possible to avoid operator's wasteful procedures or wasteful time consumption such as he finds that focusing is impossible only after rashly shifting procedures to the macro region. In addition, there is no such disadvantage that the operator gives up photographing due to the impossible focusing in the variable power region although proper macro photographing is possible only if it is switched to the macro region, or a valuable shutter chance is lost by wastefully consuming time till he becomes aware that he only has to take the moving procedure to the macro region.

The present invention also provides an automatic focal point adjusting device including photographing lenses having a variable power region and a macro region capable of macro photographing, a focal point detection means for receiving light from an object to be focused transmitting through the photographing lenses and detecting a deviating direction of a focused position of the object relative to an intended focal point position and a focused state of the object to be focused and driving means for starting a movement of a focusing lens of the photographing lenses toward the focusing direction when a not-focused state is judged by the focal point detection means and stopping a movement when the focused state is judged, the device comprising an end detection means for detecting as to whether a driving position of the focusing lens of the photographing lenses has reached end of the driving range in the variable power region or not, an inhibition means for inhibiting an operation of the driving means when end is detected by the end detection means, a releasing means for responsing to the end detection in the end detection means, comparing data of deviating directions from the focal point detection means just before and just after detection and releasing an inhibiting operation of the inhibiting means if both of directions do not agree with each other, a region judging means for judging as to whether the photographing lenses are situated in the macro region or not and a macro information provide means for responsing to the end detection from the end detection means when it is judged that the photographing lenses are not situated in the macro region by the region judging means, comparing driving directions of the focusing lens obtained from the focal point detection means just before and just after detecting and outputting a promotion information indicating that the photographing lenses should be shifted into the macro region if both of directions agree with each other and the driving direction is toward a nearest position.

Since the automatic focal point adjusting device according to the present invention is adapted such that the operation of the driving means is inhibited instantly when the driving position for the focusing lens of the photographing lenses reaches the end of the driving range in the variable power region, it is possible to prevent overload from being exerted on the driving means and wasteful consumption of electrical power. Further, since it is so adapted that the inhibiting operation of the driving means is released and the focusing lens is driven toward the infinite position when an erroneous distance measuring information indicating that as if the object to be focused were at the distance (position) nearer than the nearest distance although it is actually at the position near the nearest distance within the focal length range in the variable power region is temporarily outputted from the focal point detection section due to the scattering in the detection output and the focusing lens is driven to and stopped at the nearest end position, focusing is made on the object to be focused situated at a position near the nearest distance. Accordingly, focusing adjustment at high accuracy is possible irrespective of the scattering in the output from the focal point detection means. Furthermore, it is also adapted so that if the object to be focused is at a position nearer than the distance corresponding to the nearest position in the variable power region, an adequate information is provided to the user as to whether the macro photographing is possible or not. Accordingly, it is possible to prevent operator's wasteful procedures or wasteful time consumption such as he finds that the focusing is impossible only after the rashly switching procedures to the macro region. It is also possible on the contrary to avoid such disadvantage that the operator gives up to take photograph because of the impossible focusing in the variable region although proper macro photographing is possible or a valuable shutter chance is lost by wastefully consuming time till he becomes awares that he has only to make switching procedures to the macro region.

The present invention also provides an automatic focusing device for use in a camera using photographic lenses having a variable power region in which an entire focal length of a variable power optical system comprising a variable power lens group, a focusing lens group and a macro lens group disposed on an identical optical axis can optionally be set by the variable power lens group between a shortest focal length and a longest focal length and a macro region capable of macro photographing by the macro lens group, as well as having, as a focusing region of the focusing lens group, a variable power focusing region from an infinite position to a nearest position on the optical axis corresponding to an object distance from the infinite distance to the nearest distance and a macro focusing region capable of macro photographing which is present substantially overlapped with the variable power focusing region, the device comprising a macro information providing means for judging as to whether a focusing in the macro focusing region is possible or not if the variable power optical system is switched to the macro region in a case where the variable power optical system is in the variable power region and a focused state can not be attained even after the fucusing lens group has reached the nearest position of the variable power focusing region and informing the result thereof to a camera operator as macro information, a variable power driving means for setting the variable power optical system to the variable power region or to the macro region and driving the variable power lens group for setting it to an optional entire system focal length in the variable power region, a focusing drive means for driving the focusing lens group, a switching actuation means capable of external operation for actuating a macro switching operation of switching the variable power optical system from the variable power region to the macro region, a switching control means for controlling the variable power driving means and the focusing driving means so that macro switching operation can be made while maintaining a predetermined relative positional relationship or a predetermined time relationship between the variable power lens group and the focusing lens group from an instance that a camera operator informed with a macro information indicating that a focusing is possible actuates the switching actuation means, a focusing lens group position detection means for detecting a position of the focusing lens group on the optical axis in the macro focusing region, a focal point detection means for receiving light from the object passing through the photographing lenses and detecting a defocusing amount of a focused position of the object relative to an intended focused position, a defocusing amount memory means for storing the defocusing amount at the instance informed with the macro information and a defocusing amount conversion means for converting the defocusing amount stored in the defocusing amount memory means into an intended focused position in the macro focusing region.

The automatic focusing device for use in a camera according to the present invention is so adapted that macro information indicating that the photographing is possible in the macro region is informed and, when an operator starts the macro switching operation based thereon, the variable power optical system is switched from the variable power region to the macro region after driving the focusing lens group to the infinite position in the variable power focusing region, as well as the defocusing amount as the distance measuring information obtained from the focal point detection means is converted by the defocusing amount conversion means into an intended focused position in the macro focusing region, which s used for the macro focusing control. Accordingly, it can be realized to unify the directionarily for the focusing and the common use of the measuring data between the variable power focusing region and the macro focusing region and, as a result, it is possible to use the focusing driving means and the focal point detection means in common for the variable power focusing control and the macro focusing control, with which the constitution of the device can be simplified by so much and the lens groups constituting the variable power optical system can be set to a predetermined relationship smoothly with no interference to each other during actuation of the macro switching operation.

The present invention also provides a variable power optical system control device for use in a camera using photographic lenses having a variable power region in which an entire focal length of a variable power optical system comprising a variable power lens group, a focusing lens group and a macro lens group disposed on an identical optical axis can optionally be set by the variable power lens group between a shortest focal length and a longest focal length and a macro region capable of macro photographing by the macro lens group, as well as having, as a focusing region of the focusing lens group, a variable power focusing region from an infinite position to a nearest position on the optical axis corresponding to an object distance from an infinite distance to a nearest distance and a macro focusing region capable of macro photographing, which is present substantially overlapped with the variable power focusing region, the device comprising a lens group driving means for setting the variable power optical system to the variable power region or to the macro region and driving the variable power lens group or the macro lens group for setting an entire system focal length in both of the regions, a region judging means for judging as to whether variable power optical system is set in the macro region or in the variable power region, a focal length detection means for outputting the focal length information corresponding to the entire system focal length when the variable power optical system is set to the variable power region, a switching actuation means capable of external operation for actuating a switching operation of switching a setting for the variable power optical system to the variable power region or to the macro region and switching control means for controlling the lens group driving means based on a focal length information when a switching operation to the variable power region is actuated by the switching actuation means in a state where the variable power optical system is set to a predetermined focal length in the macro region so that the entire system focal length in the variable power region is set substantially equal with or shorter than a predetermined focal length.

Since the variable power optical system control device according to the present invention is so adapted that the variable power optical system is set to such a focal length as substantially equal with a predetermined focal length in the macro region or to a shorter focal length in the variable power region uon switching from the macro region to the variable power region, change in the view of angle sensed by human eyes can be eliminated substantially from a practical point of view. In addition, the switching can be made smoothly with no disturbance to the operator.

The present invention further provides a display device for use in a camera using, as photographic lenses, such vari-focus lenses as having at least a variable power region in which an entire focal length of a variable power optical system comprising at least a variable power lens group and a focusing lens group disposed on an identical optical axis can optionally be set by the variable power lens group between a shortest focal length and a longest focal length, as well as having, as a focusing region of the focusing lens group, a variable power focusing region from an infinite position to a nearest position on the optical axis corresponding to an object distance from an infinite distance to a nearest distance, the device comprising a lens judging means for judging as to whether photographing lenses mounted to the camera are photographing lenses having a macro function capable of macro photographing or not, a region judging means for judging as to whether the photographing lenses are set to the macro region or not, a focal point detection means for receiving light from the object transmitting the photographing lenses, detecting a deviating direction and a focused state of the focused position relative to an intended focused position of the object and outputting them as distance measuring information and a promotion information providing means for providing a promotion information calling the camera operator's attention to that the photographing lenses are moved to the macro region when it is judged by the lens judging means that the photographing lenses have a macro function and also judged by the region judging means that the photographing lenses are not in the macro region in response to a distance measuring information indicating that the object is present at a position nearer to the nearest position.

The display device according to the present is adapted to judge whether the lenses mounted to the camera are photographing lenses having the macro function or not, judging as to whether the object at a distance nearer than the nearest distance can be photographed or not in the macro region properly and at a high accuracy if they are judged to be the photographing lenses having the macro function, and the demand information calling the operator's attention to the shifting operation to the macro region when it is judged that the photographing is possible. Accordingly, it is possible to eliminate operator's wasteful procedures or wasteful time consumption such as he finds that the focusing is impossible only after the rashly switching procedures to the macro region. It is also possible on the contrary to avoid such disadvantage that the operator gives up to take photograph because of the impossible focusing in the variable region is although proper macro photographing is possible, or a valuable shutter chance is lost by wastefully consuming time till he become aware that he has only to make switching procedures to the macro region.

Description will be made more specifically to preferred embodiments of the present invention referring to accompanying drawings from FIG. 1 to FIG. 15, by which the features and the objects of the present invention will become apparent. However, the present invention is no way limited only to such embodiments but can be practiced in various modifications within the scope not departing the gist thereof.

FIG. 3 is a diagram illustrating the characteristics of the embodiment in the macro region, particularly, the macro photographing possible range;

FIG. 4 shows how FIGS. 4(i) and (ii) fit together.

Figure 1:
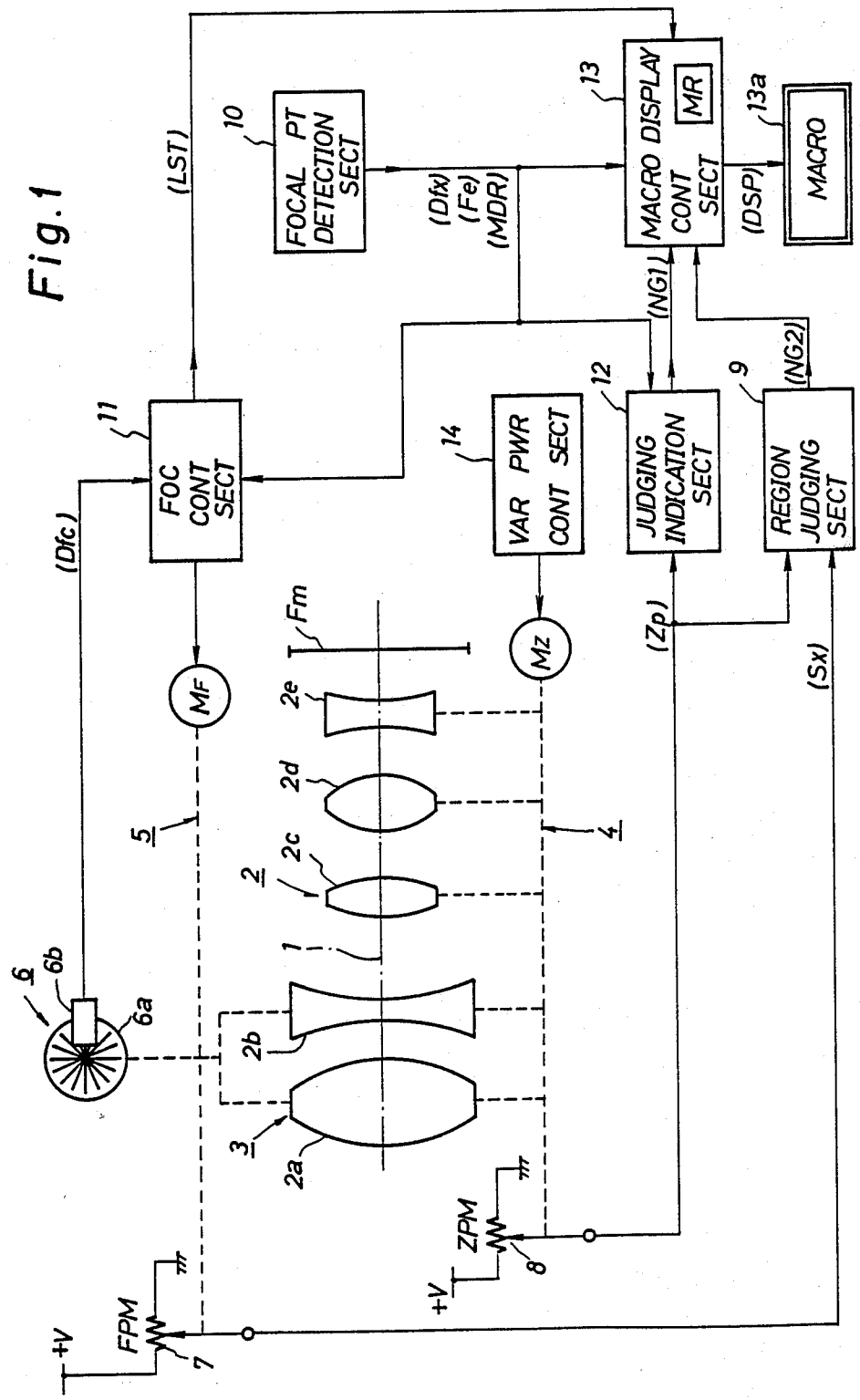
FIG. 1 is a block diagram illustrating the entire constitution of one embodiment for an automatic focusing device of a camera according to the present invention.
Figure 6:
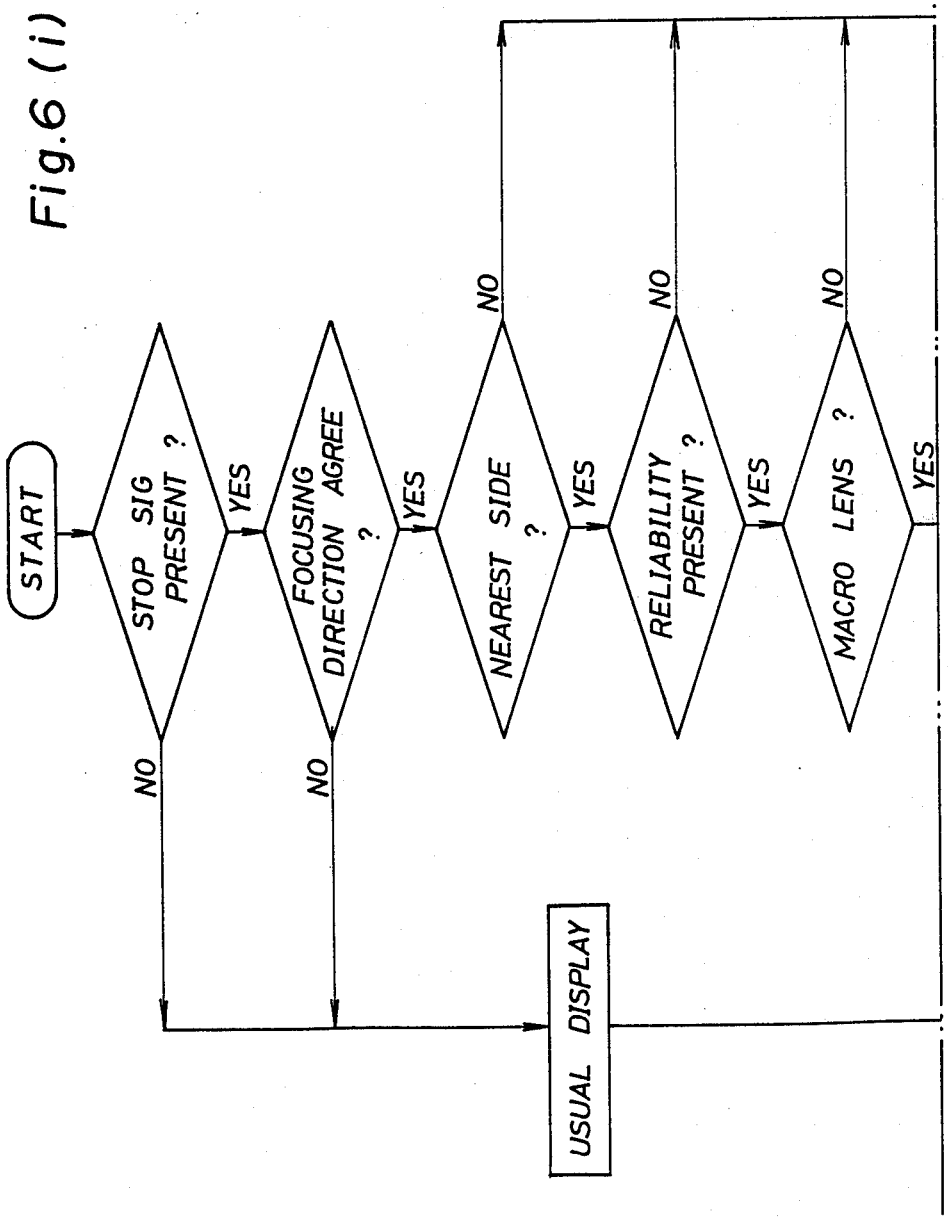

FIGS. 4(i) and 4(ii) are flow charts illustrating the operation sequence of the preferred embodiment shown in FIG. 1;

FIG. 5 is a block diagram illustrating the entire constitution of one embodiment for an automatic focusing device of a camera according to the present invention;

FIG. 6 shows how FIGS. 6(i) and 6(ii) fit together.

Figure 7:
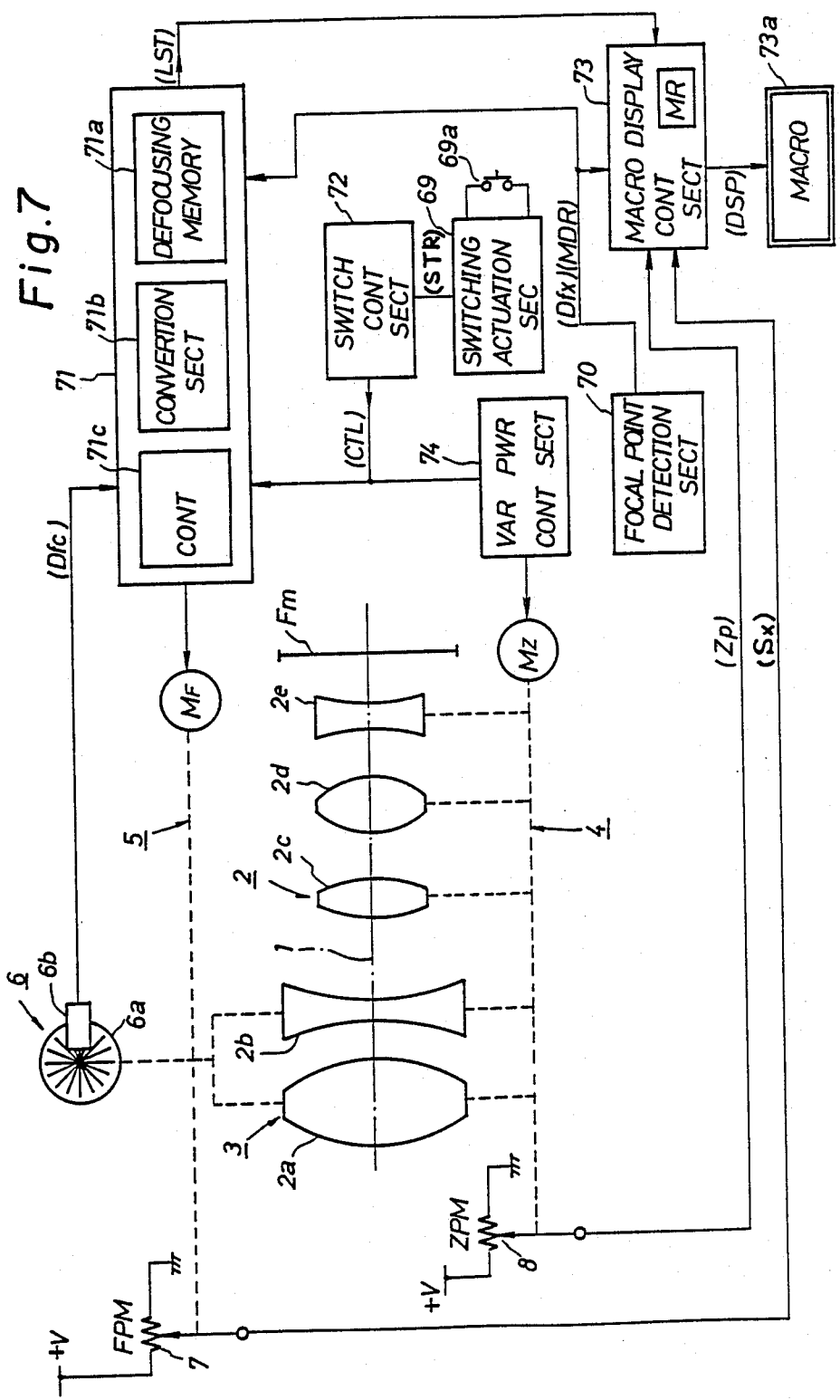
Figure 8:
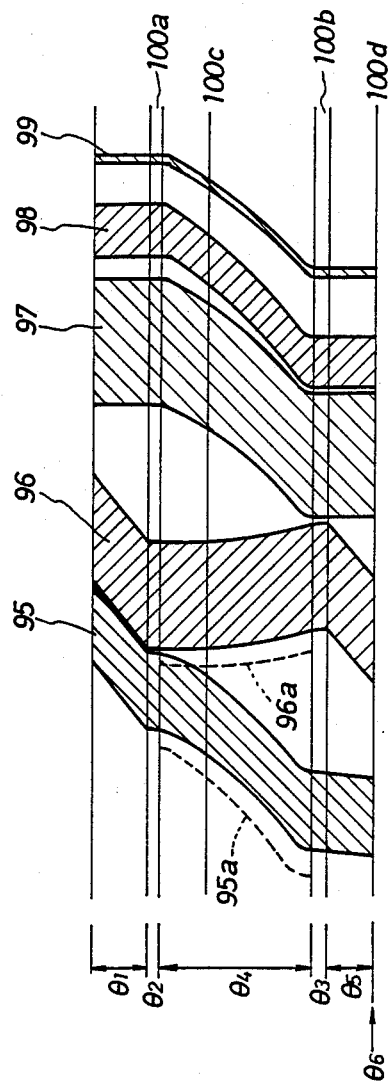
Figure 9:
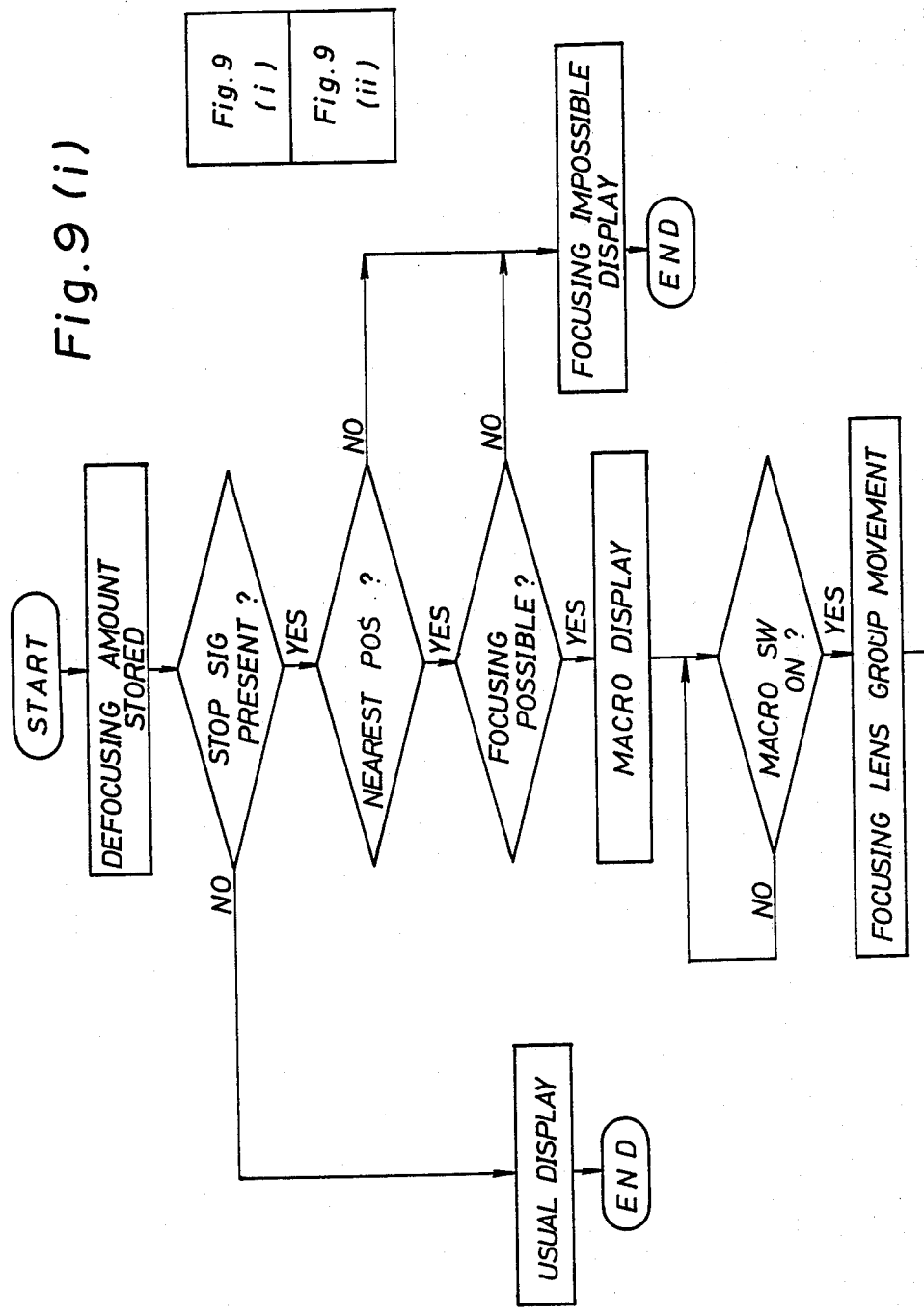

FIGS. 6(i) and 6(ii) are flow charts showing the operation sequence of the embodiment shown in FIG. 5;

FIG. 7 is a block diagram illustrating the entire constitution of another embodiment for an automatic focusing device of a camera according to the present invention;

FIG. 8 is a cam diagram illustrating the moving trace for each of lens groups constituting the variable power optical system in the preferred embodiment;

FIG. 9 shows how FIGS. 9(i) and 9(ii) fit together.

Figure 11:
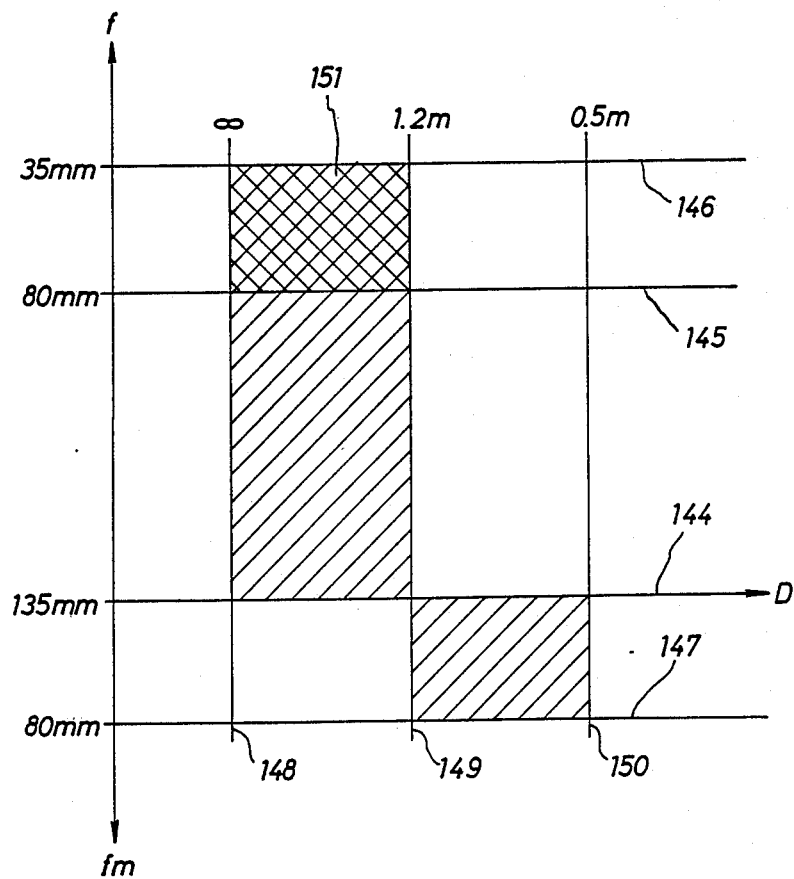
Figure 12:
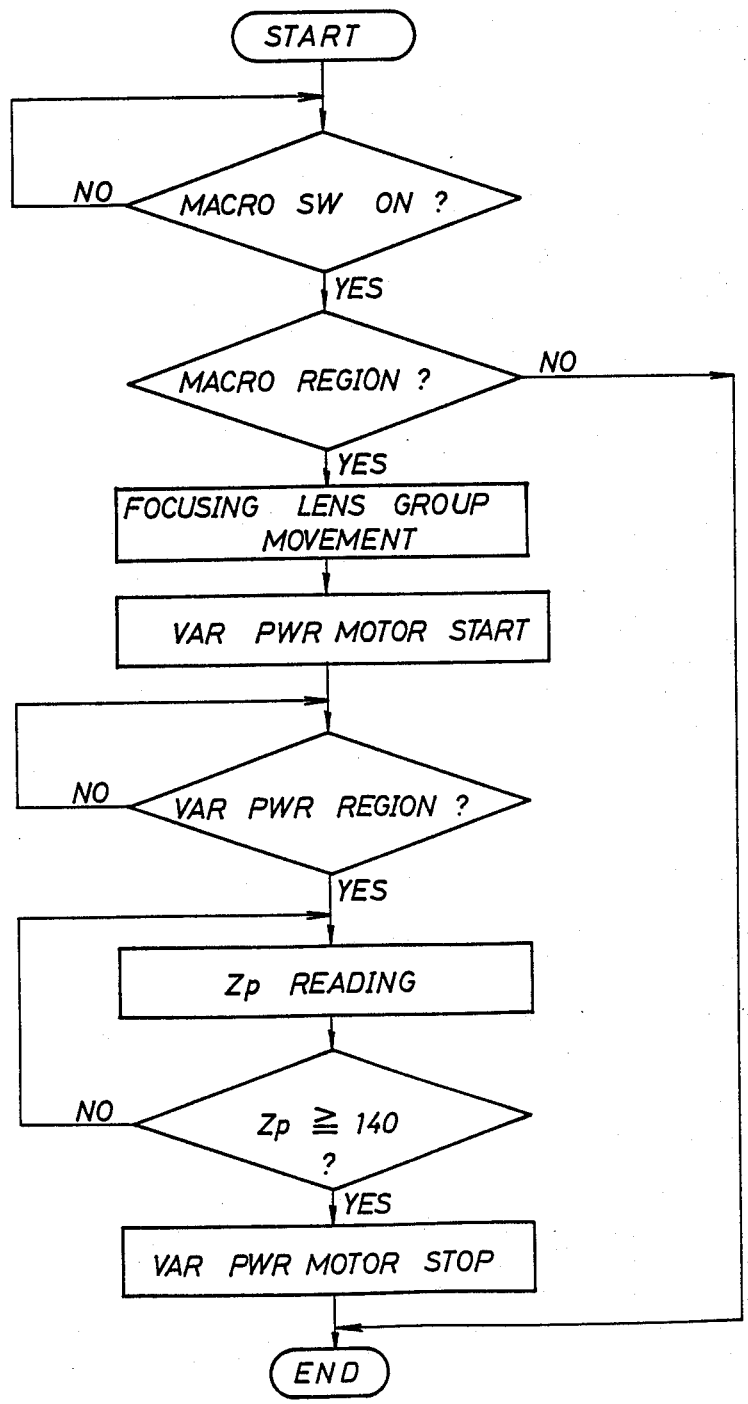
Figure 13:
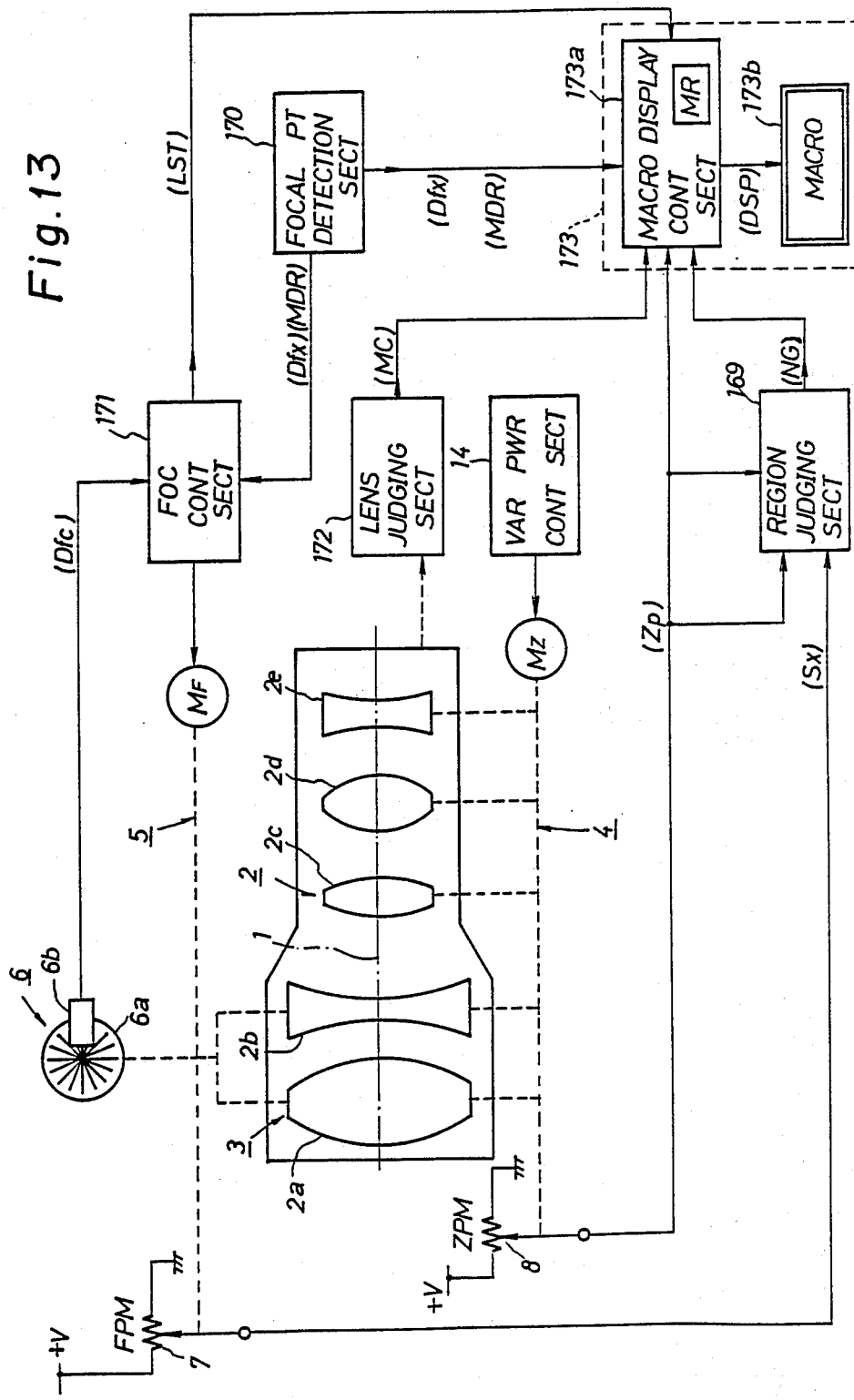
Figure 14:
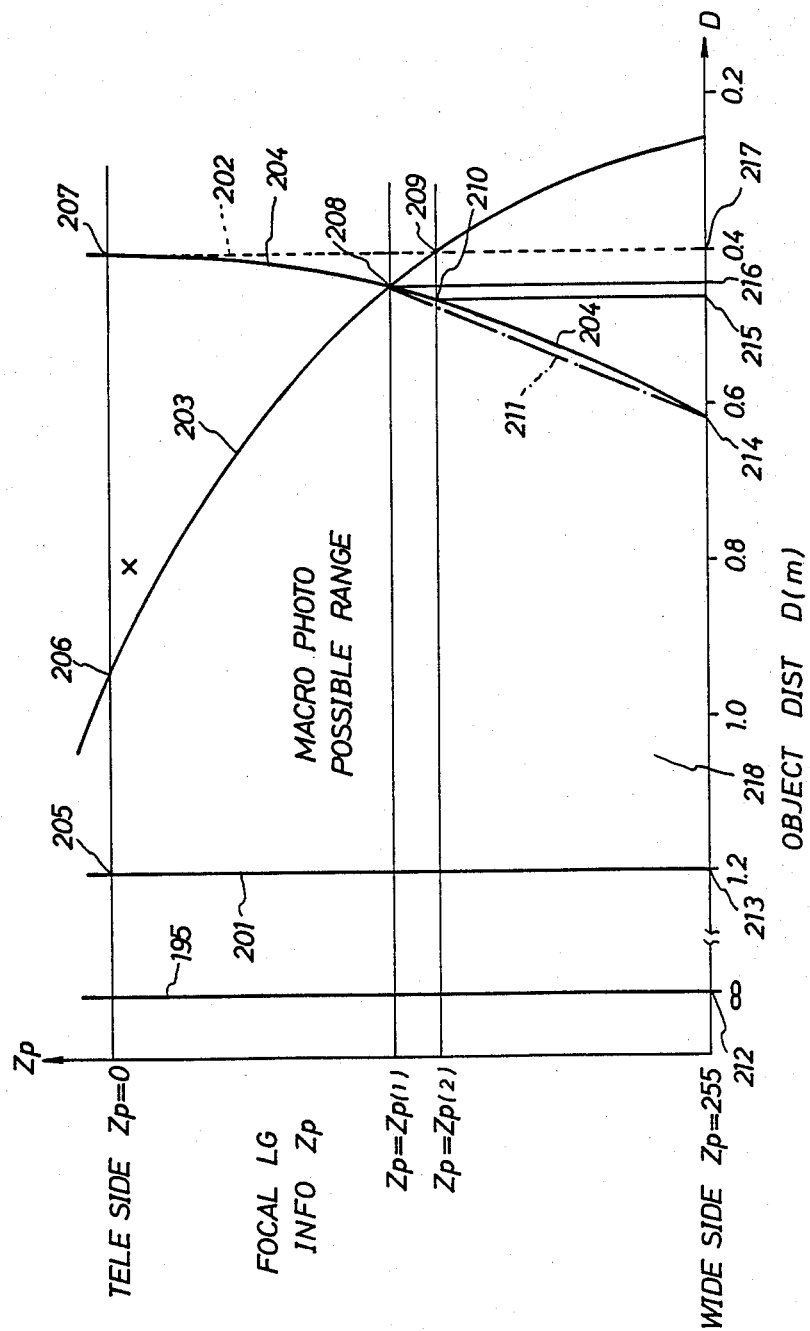

FIGS. 9(i) and 9(ii) are flow charts illustrating the operation sequence of the embodiment shown in FIG. 7;

FIG. 10 is a block diagram illustrating the entire constitution of one embodiment for variable power optical system control device of a camera according to the present invention;

FIG. 11 is a diagram for explanating the relationship between each of the regions of the embodiment;

FIG. 12 is a flow chart illustrating the operation sequence of the embodiment;

FIG. 13 is a block diagram illustrating the entire constitution of one embodiment for the display device of a camera;

FIG. 14 is a diagram illustrating the characteristics of the preferred embodiment in the macro region, particularly, a diagram showing the macro photographing possible range;

FIG. 15 shows how FIGS. 15(i) and 15(ii) fit together.

FIGS. 15(i) and 15(ii) are flow charts illustrating the operation sequence of the preferred embodiment.

DESCRIPTION OF THE PREFERRED EMBODIMENT

In FIG. 1, are shown an optical axis 1 for variable power optical system, and a variable power optical system 2 as photographic lenses disposed movably on and along the optical axis 1 and comprising a variable power lens group, a focusing lens group and a macro lens group, in which 2a, 2b, 2c, 2d, 2e represent, respectively, the first group lens, the second group lens, the third group lens, the fourth group lens and the fifth group lenses each composed of a single lens or a plurality of lens. The first group lens 2a and the second group lens 2b constitute the focusing lens group 3 as the focusing lens group. Accordingly, the macro lens group or the variable power lens group is constituted including the first group and the second group lenses 2a, 2b and with the third group lens 2c through the fifth group lens 2e. Fm represents the film face. There are also shown a variable power driving section 4 comprising a variable power motor Mz and a not-illustrated mechanical section for driving the variable power optical system 2 in order to set the entire system focal length f to an optional focal length for the variable power region from the telescopic focal length (hereinafter simply referred to as TELE side) as the longest focal length to the focal length on the wide angle side (hereinafter simply referred as "WIDE side") as the shortest focal length, or to a predetermined focal length of the macro photographing possible range, and a focusing drive section (driving means) 5 comprising a focusing motor $M_F$ for driving the focusing lens 3 to a focused position in the variable power focusing region from the infinity position ($\infty$ position) to the nearest position on the optical axis 1 corresponding to the object distance from the infinity to the nearest (object distance to be focused), or to the focused position in the macro focusing region disposed from the nearest position on the side opposite to the $\infty$ position (more specifically, moving in the direction of the optical axis while maintaining the distance between the first group lens 2a and the second group lens 2b constant) and a not illustrated mechanical portion. Portions 6 and 7 are respectively driven together with the focusing lens group 3 by the focus driving section 5 in which a focus counter 6 generates pulses in proportion to the number of rotation of a photo-interrupter 6b when a slit disc 6a is rotationally driven and detects the moving amount of the focusing lens group 3 on the optical axis 1, while a focusing lens group position detector 7 outputs the voltage in proportion with the position on the optical axis of the focusing lens group 3 as the focus position information Sx (hereinafter simply referred to as "FPM"). A focal length detection device 8 is adapted as focal length detection means to be driven together with the variable power optical system 2 by the variable power driving section 4 and output a voltage under a predetermined relationship to the entire system focal length f (for example, $f\alpha 1/Zp$) as the focal length information Zp (hereinafter simply referred to as "ZPM"). A region judging section 9 is disposed as the region judging means for receiving the focal length information Zp and the focal position information Sx, applying A/D conversion to them respectively, judging if the variable power optical system 2 is within the variable power region or in the macro region and outputting a negative signal (NG2) if it is not in the macro region. A focal point detection section 10 is disposed as the focal point detection means for receiving the optical beam from the object (object to be focused, not illustrated) transmitting through the variable power optical system 2 and detecting the defocusing direction (deviating direction) and defocusing amount (focused state) of the focused position of the object relative to the intended focal position, and it outputs the focused direction signal MDR and the defocusing amount Dfx that means the driving of the focusing lens 3 to the side of the nearest position at MDR=1 and to the side of $\infty$ position at MDR=−1 and further outputs a check signal showing the reliability of the data as Fe=1 when there is any error due to some or other reasons (for example, noises) to the processing in the focus detection section 10 and as Fe=0 when it is normal. These (Dfx), (MDR), (Fe) may some time be collectively referred to hereinafter as the distance measuring data. Further, the focal point detection section 10 is adapted to generate the distance measuring data described above, for example, by the correlationship method using CCD as the light receiving element for instance. Referring to the defocusing amount Dfx, Dfx=0 upon focused state and Dfx=2048 for the maximum defocusing amount which is reliable and can be measured.

A focus control section 11 is disposed as the focusing drive control means for receiving the distance measuring data (Dfx), (Fe), (MDR) and the output (Dfc) from the focus counter 6 and driving the focusing lens group 3 by way of the focusing drive section 5 to the focused position under control and it is adapted to drive the focusing lens group 3 upon receiving the focusing direction signal (MDR), detect that the focusing lens group 3 is stopped at the end (or midway) of the focusing region if the output from the focus counter 6 (Dfc) shows no change during a predetermined of time in the driving to interrupt the driving for the focusing lens group 3 and also outputs a stop signal (LST). Further, the focus control section 11 is adapted to stop the focus motor $M_F$ at a position judged to be focused when the output from the focus counter 6 (Dfc) agrees with the defocusing amount (Dfx). A judging indication section 12 is disposed as the judging indication means for determining the focusing limit value Dfm showing the focusing (photographing) possible range relative to Zp in the macro focusing region upon receiving the output (Zp) from ZPM 8 and defocusing amount (Dfx) outputted from the focal point detection section 10 and outputs a negative signal (NG1) if the defocusing amount (Dfx) exceeds the focusing limit value Dfm. A macro display control section 13 and a display 13a, for example, composed of liquid crystals are disposed as macro information providing means respectively. The macro display control section 13 displays signals, letters, etc. showing that the focusing is impossible by the display signal (DSP) as the operation promotion information upon receiving the negative signals (NG1) and (NG2). It stores the focusing direction signal (MDR) just before receiving the stop signal (LST) in the internal memory MR, compares it with the content of the focusing direction signal (MDR) just after receiving the stop signal (LST). Then, if they agree with each other and the contents are: MDR=1, letters showing the macro photographing possible, for example, letters "MACRO" are displayed on the display 13a by the display signal (DSP) (illustrated state). It is also adapted such that in the case other than the above, symbols or letters for example, ZOOM indicating that it is in the variable power region are usually displayed. A variable power control section 14 is disposed for driving the variable power optical system 2 under control so that the variable power optical system 2 is set by way of the variable power driving section 4 to an optional focal length in the variable power region or a predetermined focal length in the macro region. Further, it is also adapted such that the operation of the variable power control section 14 is started by the external operation of a camera operator (user) applied to operation switches such as a magnification ration-up/down switch, variable power/macro changing switch, etc. although not illustrated. Further, +V represents a power source and only main signals are shown for the input/output in each of the sections.

Figure 2:
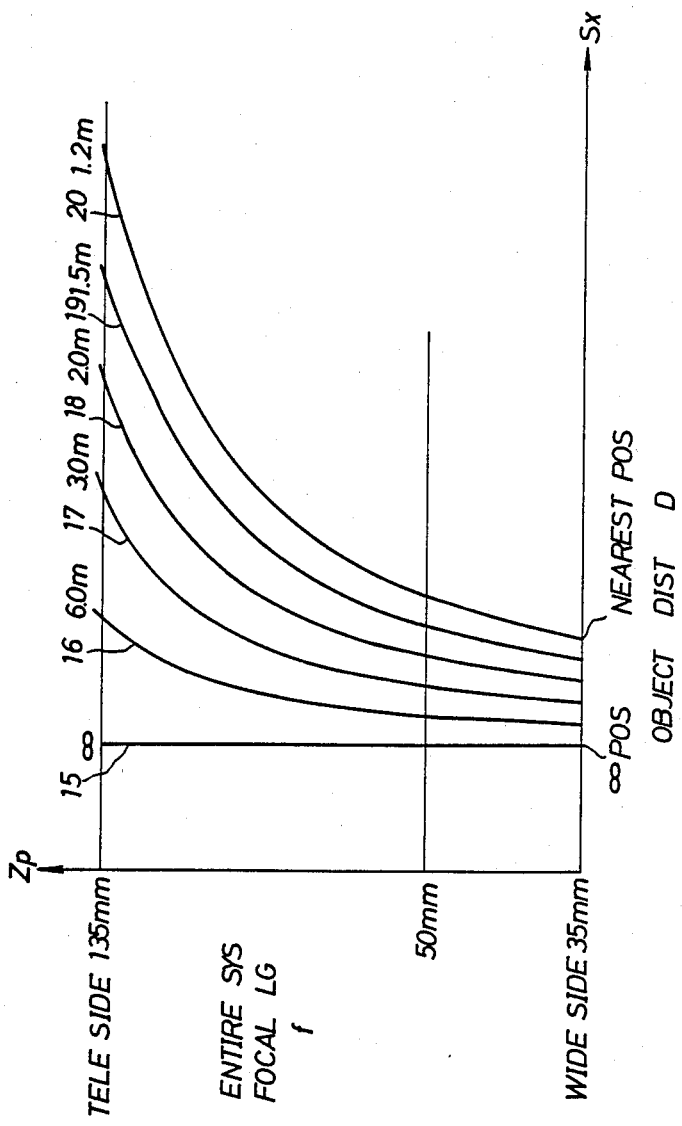
FIG. 2 is a diagram illustrating the characteristics of the preferred embodiment in the variable power region.

FIG. 2 is a diagram showing the characteristics of the device according to the present invention shown in FIG. 1 in the variable power region. In the diagram, the entire system focal length f to be set and the protruding amount (moving amount) of the focusing lens group 3 (first group lens 2a and the second group lens 2b) corresponding to the object distance D are shown on each of typical object distance D, in which the change in the entire system focal length f is indicated on the ordinate, while the protruding amount of the focusing lens group 3 on the bases of the focused position relative to the infinite position is indicated on the abscissa respectively. In this example, the TELE position means f=135 mm, while WIDE position means f=35 mm. In FIG. 2, focusing curves 15–20 each represented by a hyperbola show the change of the protruding amount of the focusing lens group 3 from the infinite position to the focused position relative to the change in the focal length information Zp assuming the object distance D as $\infty$, 6.0 m, 3.0 m, 2.0 m, 1.5 m, 1.2 m respectively. Accordingly, the focusing curve 20 is the nearest focusing curve which gives the maximum protruding amount in the variable power region and the nearest focusing curve 20 is, particularly, referred to as Fpc. Assuming the setting constants determined upon design of the variable power optical system 2 as $C_1$, $C_2$ and $C_3$ respectively, Fpc can be determined, for example, by the calculation formula:

$$Fpc=(C_2/(Zp+C_1))+C_3 \tag{1}$$

Fpc is hereinafter referred as the nearest end value.

FIG. 3 is a diagram illustrating the characteristics in the macro region of the device according to the present invention shown in FIG. 1 in the same manner as in FIG. 2, particularly, for explanating the photographing possible range in the macro region, that is, a range capable of focusing. In FIG. 3, the ordinate is like that in FIG. 2, i.e., Zp=0 is a value for Zp corresponding to the TELE side, Zp=154 and Zp=170 are the values for Zp determining the limit for the focusing possible range as described later, while Zp=255 is a value for Zp corresponding to the WIDE side. The abscissa shows the object distance D corresponding to the focus point position information Sx based on the object distance D=1.2 m corresponding to the nearest position as the standard. In the figure, there are shown a reference line 21 indicated by the linear line of D=1.2 m serving as the standard, the closest line 22 showing the object distance nearest to the camera, being shown by the linear line D=0.4 m (shown by broken line in the drawing), a maximum defocusing curve 23 showing the maximum defocusing amount that is reliable and can be measured on the film Fm, a limit curve 24 defined by providing a predetermined margin for eliminating the effect of actual error or the like, and respective intersections 25, 26, 27 between the linear line Zp=0 and the standard line 21, the maximum defocus curve 23 and the limit curve 24 respectively, an intersection 28 between the maximum defocus curve 23 and the limit curve 24 that corresponds to Zp=154, an intersection 29 between the maximum defocus curve 23 and the closest line 22 that corresponds to Zp=170, an intersection 30 on the limit curve 24 corresponding to the Zp=170, the approximate limit line 31 depicted by the dotted chain prepared by approximating the sections of the limit curve 24 between Zp=154 - Zp=255 with a linear line, intersections 32–37 each on the line indicated at Zp=255, in which 32 represents an intersection with the focusing curve 15 at the ∞ position, 33 represents an intersection with the standard line 21, 34 represents the intersection between the limit curve 24 and the approximate limit curve 31, 35 and 36 represent respectively intersections with perpendiculars from the intersections 30 and 28 respectively, and 37 represents an intersection with the closest line 22. Further, the intersections 32 and 33 are the same as the ∞ position and the nearest position in FIG. 2, and the intersection 37 is some time referred to as "the closest position". There is also shown a macro photographing (focusing) possible range 38 which is surrounded with both of the lines at Zp=0 and Zp=255, as well as the standard line 21, the maximum defocusing curve 23 from the intersection 26 to the intersection 28 and the approximate limit line 31. Further, the variable power focusing region is depicted as the range from the focusing curve 15 at the ∞ position to the standard line 21, while the macro focusing region is depicted by the range from the standard line 21 to the closest line 22.

Next, description will be made to the reason why the macro photographing possible range 38 is formed.

Assuming that the focusing lens group 3 is at the ∞ position in the variable power focusing region, that is, on the focusing curve 15, the following equation is established from the Newton's focusing equation to the relationship for the defocus distance l (defocusing amount) on the film surface Fm, the entire system focal length f and the object distance D:

$$l \cdot D = f^2 \quad (2)$$

Assuming then that objects A, B situate at object distances Da, Db respectively (where Da<Db) and none of A and B is focused, and further assuming that the defocusing distance of the objects A, B on the film surface Fm as la, lb respectively; la>lb and the following equations can be obtained from the equation (2):

$$la = f^2/Da \quad (3)$$

$$lb = f^2/Db \quad (4)$$

Then, the defocus length δ relative to the object A when the object B is focused (when the photographing lens is situated at the object distance Db) (assuming δ>0) is determined as:

$$\delta = la - lb$$

$$= f^2 \cdot ((1/Da) - (1/Db)) \quad (5)$$

the equation (5) can be modified as:

$$Da = 1/((\delta/f^2) + (1/Db)) \quad (6)$$

Then, using the nearest object distance 1.2 m, setting Db=1200 mm, the maximum defocusing distance capable of measurement δ=6 mm and substituting them together with the relationship of the entire system focal length f and the focal length information Zp: f∝1/Zp into the equation (6), and replacing the change of Da relative to the change of Zp=0−Zp=255 with Da=D, the maximum defocusing curve 23 is shown in FIG. 3. Then, the maximum defocus curve 23 intersects the closest line 22 at the intersection 29 in which the value for Zp=170. That is, the ideal macro photographing possible range is defined as a rectangular portion surrounded with the lines of Zp=0 and Zp=255, as well as the standard line 21 and the closest line 22. However, it is restricted at first by the characteristics of the focal point detection section 10 described above. Then, in order to ensure the reliability for the judgement as to if the macro photographing is possible or not (hereinafter referred to as "macro judgement"), it is required to previously set a predetermined margin while taking the error in view of the processing in the focal detection section 10 (particularly, calculating operation), error in reading from ZPM 8 (A/D conversion) etc. into consideration. That is, it is sufficient to set a margin lm to the defocusing length l corresponding to the object distance D=Dc from the closest line 22 slightly toward the standard line 21 in FIG. 3, providing that Da<Dc<Db. The equation (2) can be rewritten as:

$$la - lm = f^2/Dc \quad (7)$$

where la>(la−lm)>lb

The equation (3) is substituted into the equation (7) and arranged as:

$$Dc = f^2/((f^2/Da) = lm) \quad (8)$$

In this case, using the object distance 0.4 m for the closest position 37, setting Da=400 mm, lm=1.6 mm as margin and substituting them together with f∝1/Zp into the equation (8) in the same manner as above and expressing the change of Dc relative to the change of Zp=0−255 as Dc=D, the limit curve 24 is shown in FIG. 3. Then, the object distance D of the limit curve 24 at Zp=170 (Dc) is indicated as the intersection 35 and, for example, D=0.46 m. That is, since 0.46−0.4=0.06 m, this means that 0.06 m of margin expressed as the object distance D is set. The macro photographing range 38 can thus be determined in this way. However, since it is complicated and disadvantageous in view of the control speed (operation speed of the device) to calculate the limit curve 24 for each of the focal length information Zp, as can be seen from the equation (8), linear line approximation which can be calculated easily is carried out. That is, since the macro photographing possible range 38 is restricted by the limit curve 24 only in the sections: Zp=154−255, an approximate function representing the approximate limit line 31 using Zp as a variant can be represented by the equation for the linear line:

$$L(Zp) = C_4 \cdot Zp + C_5 \qquad (9)$$

where $C_4$ and $C_5$ are constants determined upon design of the variable power lens system 2. The above constants are: $C_4 = 13$, $C_5 = -1350$ in this embodiment. These constants can be determined from the object distance D at the intersections 36, 34 and the values for Zp at the intersections 28, 30 and 34 in the diagram.

FIG. 4 is a flow chart illustrating the operation sequence for the embodiment shown in FIG. 1. Explanation for the constitution of the flow chart is omitted here since it will be stated hereinafter in conjunction with the explanation for the operation.

The operation of the embodiment having thus been constituted is to be explained referring to the flow chart shown in FIG. 4. It is assumed here that the variable power optical system 2 is in the variable power region described above and the focusing lens group 3 is in the variable power focusing region described above. Corresponding to FIG. 2, it is assumed, for example, that the focal length is f=50 mm, the focusing lens group 3 is on the focusing curve 16 which corresponds to the object distance D=6.0 m. It is also assumed that the object is situated, for example, at D=0.8 m in FIG. 3. That is, it is assumed within the macro photographing possible range 38.

When a release switch (not illustrated) for starting the photographing operation or distance measuring operation constituting a part of the photographing operation is actuated, the focal point detection section 10 at first starts the distance measuring operation to output distance measuring data (Dfx), (Fe), (MDR). That is, it outputs the defocusing amount (Dfx) corresponding to the object distance D=0.8 m, for example, Dfx=980, outputs Fe=0 as the check signal (Fe) judging that there is no error in the distance measuring operation and, finally, outputs MDR=1 as the focusing direction signal (MDR) since it is the driving toward to the nearest side. Upon receiving MDR=1, the focus control section 11 causes the focus motor $M_F$ to rotate and starts to drive the focusing lens group 3 to the nearest side by way of the focusing driving section 5. Accompanying with this operation, the focus counter 6 outputs the output (Dfc) showing the moving amount of the focusing lens 3. The focus control section 11 monitors continuously whether Dfc=Dfx or not. In FIG. 2, The focusing lens group 3 situated at the intersection between the focusing curve 16 and the line: f=50 mm moves on the linear line: f=50 mm, passing the intersections with the focusing curves 17, 18, 19 successively and reaches the intersection with the nearest focusing curve 20. That is, the focusing lens group 3 reaches the end of the nearest side in the variable power focusing region and stops when abutted against the wall of a cam on the nearest position (not illustrated). Along with this operation, the slit disc 6a of the focus counter 6 is also stopped. The focus control section 11, detecting that there is no change in its output (Dfc) for a predetermined of time, outputs a stop signal (LST). While on the other hand, the macro display control section 13 continuously writes the focusing direction signals (MDR) among the distance measuring data (Dfx), (Fe), (MDR) outputted from the focal point detection section 10 into the internal memory MR to store the newest information and prepares so that the data just before the input and just after the input of the stop signal (LST) can be compared.

Now, the flow chart shown in FIG. 4 starts from START at the instance when the stop signal (LST) is outputted. At first, at the conditional branch of "focusing direction agree ?", the macro display control section 13 compares the focusing direction signals (MDR) just before and just after the input of the stop signal (LST). In the present case, since the object is situated on the side of the closest position 37 which is nearer to the camera than the nearest distance D=1.2 m, MDR=1 just before the output of the stop signal (LST) and MDR=1 also just after it since the direction to be driven is identical. That is, since the focusing directions agree with each other, the flow is branched to YES. Then, at the next conditional branch "stop signal present ?", since the stop signal (LST) has already been outputted as described above, the flow is branched to YES. In the two conditional branches, if the flow is branched into NO, those letters showing that the variable power optical system 2 is in the variable power region, for example, letters such as ZOOM are displayed on the display 13 at the next "usual display" and then all of the operations are completed at "END". Now, at the next conditional branch "focusing direction to the nearest side ?", the focusing direction signal (MDR) is checked and since MDR=1 as described above, the flow is branched to YES. Then, also at the next conditional branch "reliability present ?", the check signal (Fe) is similarly checked and since Fe=0 also in this case as described above, the flow is branched to YES. Next, at "ZP reading", the region judging section 9 reads the focal length information Zp from the ZPM 8, applies A/D conversion thereto and then calculates the nearest end value Fpc at that Zp according to the equation (1) at the next "nearest calculation end value calculation". At the next conditional branch "lens at nearest position ?", the region judging section 9 reads the focus position information Sx from the FPM 7 for recognizing the present position of the focusing lens group 3, applies A/D conversion thereto and then determines the difference between the nearest end value Fpc and the value Sx. If the difference is within a predetermined amount, it is judged that the focusing lens group 3 is at the nearest position, that is, it is on or extremely near the focusing curve 20 shown in FIG. 2 and the flow is branched to YES. That is, at this conditional branch, it is confirmed that the variable power optical system 2 is in the variable power region and that the focusing lens group 3 has reached the nearest end of the variable power focusing region.

Now, since the preparation for the macro judgement has thus been made, the operation of the macro judgement as the essential portion of the present invention is to be explained. At the next conditional branch "Zp≦154 ?", judgement is made as to which of the maximum defocus curve 23 or the approximate limit line 31 is used for determining the practical limit for the macro photographing possible range 38. That is, if Zp is within the range (i) where 0≦Zp<154, the limit is determined by the maximum defocus curve 23, whereas if Zp is within a range (ii) where 154≦Zp≦255, the limit is determined by the approximate limit line 31. In this case, since the focal length of the variable power optical system 2 is f=50 mm, if Zp=217 for instance in this case, the flow is branched to YES since it is within the range (ii) described above. Then, at the next step "Dfm=L(Zp)", L(Zp)=13×217−1350=1471 is calculated by using the above-mentioned equation (9) to determine the focus limit value Dfm=1471. At the next conditional branch "Dfx≦Dfm?", the focusing limit value Dfm=1471 is compared with the defocusing amount Dfx=930 outputted from the focal point detection section 10 and, since the defocusing amount Dfx does not exceed the focusing limit Dfm, the flow is branched to YES. That is, the judgement indication section 12 judges that the focused state will surely be obtained by moving the focusing lens group 3 to the macro focusing region and does not output the negative signal (NG1). Accordingly, at the next "MACRO display", since the macro display control section 13 is not inputted with the negative signal (NG1), it judges next the macro photographing is possible and outputs a display signal (DSP) indicating this to the display 13a thereby causing the display 13a to display letters "MACRO" shown in FIG. 1. Then, the operation for the macro judgement is completed at "END".

Then, description is to be made for the case where the flow is branched to NO at the conditional branch "Zp≦154 ?" described above. This corresponds to the above-mentioned case where the entire system focal length f is not 50 mm but, for example, 90 mm. Then, assuming that the focal length information Zp=115 at f=90 mm, since it is within the range (i) described above, the flow is branched to NO and advances to "Dfm=2048". The operation means that the focusing limit value Dfm is determined fixedly and, referring to FIG. 3, this means that the limit for the macro photographing possible range 38 in the range (i) described above is determined by the maximum defocus curve 23. That is, the next conditional branch "Dfx≦Dfm ?" is substantially "Dfx≦2048?". Further, the numerical value 2048 means the defocusing amount Dfx outputted from the focal point detection section 10 when the maximum defocusing distance capable of measurement on the film surface Fm is: δ=6 mm. Assuming the object distance as: D=0.8 m, since the defocusing amount Dfx=930 as described above, and smaller than Dfm=2048, the flow is branched to YES and the macro judging operation is advanced by way of "MACRO display" and ended at "END".

Now, at the conditional branch "Dfx≦Dfm?", in a case where the entire system focal length f is set near the TELE side (Zp=0), for example, at the position indicated by the symbol x in FIG. 3, even for the same object distance D=0.8 m, since it is out of the macro photographing possible range 38, the flow is branched to NO and advanced to "focusing impossible display". That is, the judgement indication section 12 judges it as focusing impossible to output the negative signal (NG1) and the macro display control section 13, upon receiving it, outputs a display signal (DSP) indicating the focusing impossible. Then, the display 13a, upon receiving this, display signals or letters indicating the focusing impossible (macro photographing impossible), and the macro judging operation is ended at "END".

By the way, other three branches leading to the "display focusing impossible" not explained so far will be described.

At first, the flow is branched to NO at "focusing direction on nearest side ?" in a case when MDR=−1, that is, movement of the focusing lens 3 toward the ∞ position. In this case, since the object is naturally situated in the direction opposite to the macro focusing region, the flow is advanced to "display focusing impossible ?" without practicing the macro judgement described above. Branching to NO at the next "reliability present?" is the same as described above. Since the defocusing amount (Dfx) and the defocusing direction signal (MDR) outputted from the focal point detection section 10 are not reliable if the check signal Fe=1, it is not necessary to practice the macro judgement. Then, the NO branch at the next "lens at nearest position ?" occurs in a case where the focusing lens group 3 stops at the midway of the variable power focusing region, for example, by an obstacle or the like. That is, since the focusing lens group 3 does not reach the nearest end, the region judging section 9 judges that the premiss for the macro judgement has not yet been prepared and outputs the negative signal (NG2). Then, the macro display control section 13 receives this negative signal (NG2) to conduct the "display focusing impossible" as described above.

As has been described above according to this embodiment, in a case where the variable power optical system 2 is in the variable power region, the focusing lens group 3 is at the end on the nearest side of the variable power focusing region and the object is situated at a position nearer to the camera than the nearest position, the focusing limit value Dfm is determined due to the focal length information Zp to form the macro photographing possible range 38, the macro judgement is conducted depending on whether the defocusing amount Dfx from the focal point detection section 10 corresponding to the distance to the object is within the macro photographing possible range 38 or not and the result is displayed. Accordingly, in a case where the focused state has not yet been attained if the focusing lens group 3 reaches the end on the nearest side, the operator can easilly judge as to if the variable power optical system 2 should be changed to the macro region or not and can rapidly conduct a most appropriate countermeasure in such a state. Accordingly, it can provide a merit of avoiding the risk of losing the shutter chance by making rashly region change operations, as well as a merit that the operator is free from disappointment knowing that the macro photographing is impossible once after conducting the switching operation. Furthermore, there is also a merit of consuming no wasteful time because the optimum countermeasures can be taken.

In addition, when the focal length information Zp is in the range (ii) described above, there is a merit that the calculation can be simplified, since the limit curve 24 is approximated to a linear line as shown in the equation (9), as well as there is another merit that the calculation speed leading to the judgement can be increased since the macro judgement is conducted by the thus obtained approximate limit line 31.

Further, upon forming the macro photographing possible range 38, since lm=1.6 mm or, when expressed by the object distance, 0.06 m is set as the margin, there is a merit that the accuracy and the reliability for the macro judgement are high. Accordingly, there is a further merit that the distance measuring accuracy on the WIDE side is not reduced.

Further, since the range is divided into the ranges (i) and (ii) by the focal length information Zp and since the macro photographing possible range 38 is determined by the approximate limit line 31 for the range (ii) and by the maximum defocus curve 23 for the range (i), it is possible to obtain a merit that there is no scattering in the accuracy due to the difference in the protruding amount for focusing the focusing lens group 3 between the TELE side (Zp=0) and the WIDE side (Zp=255) and the accuracy can be unified.

The closest position is not restricted only to 0.4 m but it may be increased or decreased provided that it is within an appropriate range in view of the specification of the camera. In addition, the margin lm for forming the macro photographing possible range 38 is not necessarily restricted only to lm=1.6 mm but it may be increased or decreased provided that it is within an appropriate range in view of the CCD constitution as described above. Further, the maximum defocus distance δ capable of distance measurement is not restricted only to δ=6 mm but may be increased or decreased so long as it is within an appropriate range in view of the CCD constitution as described above.

Further, within the range (ii) of the focal length information Zp, the macro photographing range 38 may be determined not by using the approximate limit line 31 but by using the limit line 24 provided that there is no problem for the reduction in the calculation speed. Further, in the equation (9) it is not always necessary to define as $C_4=13$, $C_5=-1350$, but they may be varied for the sake of the design in the variable power optical system 2.

Further, the boundary between the range (i) and (ii) above may not necessarily be restricted only to Zp=154 and it may be increased or decreased properly so long as it is within a range capable of optimally conducting the macro judgement.

Further, the operation promotion information is not restricted only to the indication by the display 13a, but sound or voice may be used. In short, it may be of any means so long as recognizable by the operator.

Further, focusing lens group 3 is not necessarily be the 2-group constitution but the number of groups may be varied if necessary in view of the design for the variable power optical system 2. While on the other hand, it is not necessarily limited to the front focusing system, but is also applicable to the inner focusing system or the rear focusing system.

Furthermore, the judgement as to if the focusing lens group 3 arrives at the end on the nearest side or not and the detection of the moving amount is not necessarily carried out only to the output Dfx from the focus counter 6 but it may be adapted, if there is problem in view of the accuracy, such that the focus control section 11 can read the focus position information Sx from the FPM 7, and the judgement may be made depending on the value of the focus position information Sx. In this case, there is an additional merit that the focus counter 6 can be saved.

FIG. 5 is a block diagram illustrated the entire constitution of another embodiment.

In FIG. 5, the same constituents as those in the device shown in FIG. 1 carry the same reference numerals and explanation will be made for the difference with respect to the device in FIG. 1.

An end detection section 46 is disposed as the end detecting means comprising a rotary encoder, etc. that generates pulses from a photointerrupter in proportion with the number of rotation of a slit disc upon rotational driving and it is so adapted to detect the moving amount of the focus lens group 3 to be driven by the focusing section 5, and judge that the focusing lens group 3 reaches the end if there is no change in the pulses for a predetermined of time, to thereby output a stop signal (LST).

A release section 51a is disposed as the releasing means for receiving the distance measuring data (Dfx), (MDR) and (Fe) outputted from the focal point detection section 10 and the stop signal (LST) outputted from the end detection section 46, storing the focusing direction signals (MDR) just before and just after the input of the stop signal (LST) into the memory MR1, and outputting a release signal (ENA) if they do not agree with each other. An inhibiting section 51b is disposed for receiving the release signal (ENA) and the stop signal (LST), outputting a motor control signal (MS) having the content of inhibiting the operation of the focus driving section 5 (that is, stopping the focus motor $M_F$) upon receiving the stop signal (LST) and outputting a motor control signal (MS) having the content of releasing the inhibition upon receiving the release signal (ENA). The release section 51a and the inhibition section 51b may some time referred to hereinafter collectively as a focus control section 51. The focus control section 51 is adapted to drive the focusing lens group 3 upon receiving the focusing direction signal (MDR) and stop the focus motor $M_F$ at the instance when the output pulses Dfc from the rotary encoder (not illustrated) of the end detection section 46 agree with the defocus amount (Dfx) during driving judging this as the focused state.

A macro information providing means 53 comprises a macro display control section 53a and a display 53b composed, for example, of liquid crystals, in which the macro display control section 53a outputs a display signal (DSP) as the promotion information to the display 53b upon receiving the negative signal (NG1) or (NG2) thereby causing the display 53b to display symbols or letters indicating that the focusing is impossible, stores the focusing direction signal (MDR) just before receiving the stop signal (LST) into the internal memory MR2, compares it with the content of the focusing direction signal (MDR) just after receiving the stop signal (LST) and, if they agree with each other, the content is MDR=1 and no negative signals (NG1), (NG2) are received, give the above-mentioned display signal (DSP) to the macro display control section 53a, thereby causing it to display the letters indicating the macro photographing possible, for instance, "MACRO" (illustrated state). In a case where the variable power optical system 2 is in the zoom region and in the case other than the above, it is also adapted so that the symbols or letters indicating that it is in the variable power region, for instance, "ZOOM" or numerical values indicating the focal length are displayed as the usual display.

Although not illustrated, a range judging section is also disposed as the photographic lens judging means for judging as to whether the variable power optical system 2 has the macro function or not.

Now the operation of this embodiment having thus been constituted will be explained along with the flow chart shown in FIG. 6 but with respect to the difference to FIGS. 1 and 4. It is assumed here that the variable power optical system 2 is in the variable power region, the focusing lens group 3 is in the variable power focusing region, the focal length is at f=50 mm (Zp=217), the focusing lens group 3 situates on the focusing curve 16 corresponding to the object distance D=6.0 m and the object situate at D=0.8 m (within the macro photographing possible range 38). A release switch (not illustrated) is actuated for starting the photographing operation or distance measuring operation constituting a portion of the photographing operation. Further, the focal point detection section 10 outputs (Dfx), (Fe) and (MDR), that is, the defocusing amount (Dfx):Dfx=980 corresponding to the object distance D=0.8 m and outputs Fe=0 as the check signal (Fe) and MDR=1 respectively. The focus control section 51 rotates the focus motor $M_F$ upon receiving MDR=1 and, when it starts to drive the focusing lens group 3 toward the nearest side by way of the focus driving section 5, the output (Dfc) showing the moving amount of the focusing lens group 3 not illustrated is outputted from the rotary encoder in the end detection section 46. The focus control section 51 continuously monitors as to if Dfc=Dfx or not. In FIG. 2, the focusing lens group 3 at the intersection between the focusing curve 16 and f=50 mm moves along the linear line: f=50 mm, passes the intersections with the focusing curves 17, 18 and 19 succesively and arrives at the intersection with the nearest focusing curve 20. In FIG. 5, when the focusing lens group 3 reaches the end on the nearest side in the variable power focusing region and stops being abutted against the wall of the cam (not illustrated) at the nearest position, the slit disc of the rotary encoder (not illustrated) is also stopped and the end detection section 46 detects that there is no change in the output (Dfc) for a predetermined of time to output a stop signal (LST). While on the other hand, the releasing section 51a and the macro display control section 53a write the focusing direction signal (MDR) among the distance measuring data (Dfx), (Fe) and (MDR) outputted from the focal point detection section 10 successively into the internal memories MR1 and MR2 respectively to store the newest information to prepare so that the data just before the input and just after the input of the stop signal (LST) can be compared.

Referring now to the flow chart in FIG. 6, since the stop signal (LST) has already been outputted from the end detection section 46, the inhibition section 51b at first outputs a motor control signal (MS) to the effect that the focus motor $M_F$ is stopped at the step "stop signal present ?" and maintains the inhibited state. At the next conditional branch "focusing direction agree ?", the release section 51a and the macro display control section 53a compare the focusing direction signals (MDR) just before the input and the just after the input of the stop signal (LST). In this case, the position of the focusing lens group 3 before the start of the driving is at the position corresponding to D=6.0 m and the object is at the position D=0.8 m which is nearer to the camera than D=1.2 m as the nearest position. Accordingly, MD=1 just before the output of the stop signal (LST) and MDR=1 also just after thereof since the direction to be driven is identical. That is, since the focusing directions agree, the flow is branched to YES. Since there is a scattering in the detection output of the focal point detection section 10, even if the object is at the shortest photographing distance within the focusing distance range of the variable power region (nearest distance) or near the infinite distance, there may be a case where an erroneous distance measuring information indicating as if the object were present at the position out of the focusing distance range (defocusing amount Dfx in this case) should temporarily be outputted and the focusing lens group 3 is driven based thereon to reach the end position and the driving thereof is stopped by the stop signal LST. In such a case, since the focusing direction signals (MDR) do not agree between just before the input and just after the input of the stop signal (LST), the release section 51a judges that and outputs the release signal (ENA) to the inhibiting section 51b. Since the inhibiting section 51b gives a motor control signal (MS) having the content of releasing the inhibition to the focus motor $M_F$ upon receiving the signal,, the focus motor $M_F$ moves the focusing lens group 3 based on the focusing direction signal (MDR) just after the input of the stop signal (LST), attainment to the focused state is judged at the instance when the defocusing amount (Dfx) just after the input of the stop signal (LST) agrees with the output pulse (Dfc) of the rotary encoder of the end detection section 46, and the focus motor $M_F$ is stopped. That is, the flow is branched in this case into NO at "focusing direction agree ?" and the focusing operation as described above is completed in the state causing the display 53b to display "ZOOM" or letters such as numerical values indicating the focal length showing that the variable power optical system 2 is within the variable power region at the next "usual display", and all of the operations are completed.

Now, at the next conditional branch "focusing direction on the nearest side ?", the focusing direction signal (MDR) is checked and, since MDR=1 as described above, the flow is branched to YES and then the check signal (Fe) is also checked at the next conditional branch "reliability present ?". Since Fe=0 again as described above, the flow is also branched to YES.

In the next step, "macro lens ?", the lens judging section 2 not illustrated judges as to whether the photographing lens has the macro function or not by distinguishing means such as notches or electrical contacts previously disposed to the photographing lenses comprising the variable power optical system 2. In the present case, the flow is branched to YES judging that the photographing lens has the macro function. If it has no macro function, the flow is branched to NO as the matter of course and completes the operation at "END".

At the next "Zp reading", the region judging section 9 reads the focal length information Zp as the output from the ZPM 8 and applies A/D conversion and then calculates the nearest end value Fpc at the focal length information Zp at "nearest end value calculation". At the next conditional branch "lens situated at nearest position ?", the region judging section 9 reads the focus position information Sx as the output from the FPM 7 and applies A/D conversion for recognizing the present position of the focusing lens group 3,and determines the difference between the nearest end value Fpc and the value Sx. If the difference is within a predetermined amount, it is judged that the focusing lens group 3 is situated at the nearest position, that is, it is at or extremely near the focusing curve 20 shown in FIG. 2 and then the flow is branched to YES without outputting negative signal (NG2). That is, at this conditional branch, preparation for the macro judgement has been made after confirming that the variable power optical system 2 is in the variable power region and the focusing lens group 3 reaches the nearest end of the variable power focusing region.

The same explanation as in FIG. 4 will be applied to a case where the flow is branched to NO from the three-above conditional branches into the "focusing impossible display".

At the conditional branch as described above, if "focusing display impossible", a display signal (DSP) indicating that the macro photographing is impossible is outputted to the display 53b and the display 53b displays the content thereof. Then, the operation is completed at "END".

Explanation will then be made to the operation of the macro judging. At first, the judgement indication section 12 judges at "focusing limit value determination" as to which of the maximum defocusing curve 23 or the approximate limit line 31 is used for determining the limit of the macro photographing possible range 38 in FIG. 3. That is, if Zp is within the range (i) where $0 \leq Zp < 154$, the limit is determined by the maximum defocusing curve 23. While on the other hand, if Zp is within a range (ii) where $154 \leq Zp \leq 255$, the limit is determined by the approximate limit line 31. In this case, since the variable power optical system 2 is set at the focal length f=50 mm (Zp=217), Zp is within the range (ii). Then, assuming the approximate limit line 31 is expressed, for example, as $L(Zp) = 13 \times Zp - 1350$, $L(Zp) = 1471$ is obtained to determine the focusing limit value: Dfm=1471. At the next conditional branch "focusing possible ?", the focusing limit value Dfm=1471 is compared with the defocusing amount Dfx=930 outputted from the focal point detection section 10 and, since the defocusing amount Dfx does not exceed the focusing limit value Dfm, the flow is branched to YES. That is, the judgement indication section 12 judges that the focused state can surely be obtained by moving the focusing lens group 3 to the macro focusing region and does not output the negative signal (NG1). Accordingly, at the next "MACRO display", since the negative signal (NG1) is not inputted, the macro display control section 53a judges that the macro photographing is possible and outputs the display signal (DSP) indicating this to the display 53b causing it to display letters "MACRO" shown in FIG. 5. Then, the operation of the macro judgement is completed at "END".

Now, explanation will be made to the case where the entire system focal length f=50 mm in the foregoing explanation is, for example, f=90 mm (Zp=115). Since the focal length information Zp=115 is within the range (i) above, the limit of the macro photographing possible range 38 in the range (i) is determined by the maximum defocus curve 23 when corresponded to FIG. 3. That is, the focusing limit value Dfm is determined fixedly as Dfm=2048. The numerical value 2048 means the maximum defocusing amount Dfx capable of distance measurement outputted from the focal point detection section 10 as described above. Then, assuming the object distance D=0.8 m at the next "focusing possible ?", since the defocusing amount Dfx=930 as described above, and this is smaller than Dfx=2048, the flow is branched to YES and, by way of "display MACRO", the operation judgement is completed at "END".

Now, at the conditional branch "focusing possible ?", in a case if the entire system focal length f is set near the TELE side (Zp=0), for example, at the position indicated by the symbol X in FIG. 3 even for the identical object distance D=0.8 m, since it is out of the macro photographing possible range 38, the flow is branched to NO and advanced to "display focusing impossible". That is, the judgement indication section 52 judges that the focusing is impossible to output a negative signal (NG1). Upon receiving this, the macro display control section 53a outputs a display signal (DSP) indicating that the focusing is impossible. Then, upon receiving this, the display 53b displays symbols or letters indicating that the focusing is impossible (macro photographing impossible) and the operation of the macro judgement is ended at "END".

While the operation of the macro judgement has thus been completed, in a case where the macro photographing is judged possible by the macro judgement, that is, if letters "MACRO" are displayed on the display 53a, the variable power optical system 2 is switched from the variable power region to a predetermined focal length in the macro region by the operator's operation to the variable power/macro changing switch (not illustrated) and the focusing lens group 3 is moved to the position on the optical axis corresponding to the object distance D=0.8 m in the macro focusing region to obtain the focused state.

This embodiment is adapted such that when the end detection is made in the variable power region, data in the deviating direction (focusing direction) outputted from the focal point detection means just before and just after the detection are compared with each other and, if both of the directions do not agree with each other, a release signal (ENA) is outputted to start the driving of the focusing lens group 3 again. Accordingly, in a case where the object situates near the end position within the photographing range capable of adjusting the focal point ($\infty$ position or nearest position), even if an erroneous distance measuring information as if the object were out of the range (defocusing amount Dfx) should be resulted temporarily, since the focal point is adjusted based on the distance measuring information just after the end detection, the focusing accuracy can be improved. On the contrary, if the deviating directions just before and just after the end detection agree with each other, the release signal (ENA) is not outputted and a motor control signal (MS) with the content of inhibiting the rotational operation of the focus motor $M_F$ is outputted from the inhibition section 51 to stop the focus motor $M_F$. Accordingly, it is possible to prevent over load from exerting on the focus motor $M_F$ and wasteful consumption of electric power. In this case, if the defocusing amount Dfx is within the macro photographing possible range 38 as described above obtained from the focal point detection section 10, since the display "MACRO" is made, the operator can obtain a well-focused close-up photograph by conducting photographing in a state switched to the macro region by actuating, for example, a variable power/macro changing switch.

The promotion information is not restricted only to the display 53b conducting visual display but sound or voice may be used. In short, it may be any of means so long as recognized by the user.

The focusing lens group 3 is not necessarily restricted only to the two group-constitution but the type and the number of lens group may be modified if required in view of the design for the variable power optical system 2.

Further, the end detection section 46 is not restricted to that using the rotary encoder but it may be so adapted that the output Sx from FPM 7 can be read by the focus control section 51 and judgement may be conducted by the value of Sx if it causes no problem in view of the accuracy.

FIG. 7 is a block diagram illustrating the entire constitution of a further embodiment. In FIG. 7, the same constituents as those in the device shown in FIG. 1 carry the same reference numerals and explanation will be made to the difference of them with respect to FIG. 1.

Switching actuation means 69 and 69a are for actuating the macro switching operation of switching the setting for the variable power optical system 2 to the variable power region or to the macro region, in which 69a represents a macro switch comprising a pushbutton switch capable of external operation and 69 represents a switching actuation section for determining the switching direction upon receiving the output from the macro switch 69a and outputting an start signal (STR). A focal point detection section 70 is disposed as a focal point detection means for detecting the defocusing direction and the defocusing amount of the focused position of an object relative to an intended focused position upon receiving optical beams from the object (not illustrated) transmitting through the variable power optical system 2 and it outputs a focusing direction signal MDR and a defocusing amount Dfx that means the driving of the focusing lens 3 toward the nearest position at $MDR=1$ and toward the $\infty$ position at $MDR=-1$ as the defocusing direction. They are sometimes referred to collectively hereinafter as distance measuring data. The focal point detection section 70 is constituted to form the distance measuring data, for example, by the correlationship method using CCD (charge coupled device) as photoreceiving elements. Then, the defocusing amount Dfx is: $Dfx=0$ at the focused position, while the reliable maximum defocus amount is: $Dfx=2,048$.

A focus control section 71 is adapted to receive the distance measuring data (Dfx), (MDR), the output from the focus counter 6 (Dfc) and a switching control signal (CTL) as described later and drive the focusing lens group 3 by way of the focus drive section 5 to the focused position in the variable power focusing region or the macro focusing region.

The focus control section 71 comprises a defocusing memory 71a as a defocusing amount memory means for storing the defocusing amount (Dfx) and the focusing direction signal (MDR) as described above when the focusing lens group 3 reaches the nearest position, a conversion section 71b as the defocusing amount conversion means for converting the defocusing amount (Dfx) outputted from the defocusing memory to an intended focused position in the macro focusing region and a controller 71c for collectively controlling the focus control section 71. The focus control section 71 is so adapted by the controller 71c that it drives the focusing lens group 3 at the instance receiving the focusing direction signal (MDR) when the switching control signal (CTL) is not being supplied, detects that the focusing lens group 3 is stopped at the end (or the midway) in the focusing region if the output from the focus counter 6 (Dfc) changes no more for a predetermined of time during driving to stop the driving for the focusing lens group 3 and, simultaneously, outputs a stop signal (LST). Further, focus control section 71 is so adapted to judge the focused position when the output from the focusing counter 6 (Dfc) and the defocusing amount (Dfx) agree with each other, to stop the focus motor $M_F$. A switch control section 72 is disposed as a switching control means adapted to receive the start signal (STR) from the switching actuation section 69 and control by the switching control signal (CTL) described above by way of the focus control section 71 described above and the variable control section described later such that the variable power lens group and focusing lens group can conduct the macro switching operation described above while maintaining a predetermined relative positional relationship or a predetermined time relationship. There are also disposed a macro display control section 73 as the macro information providing means and a display 73a, for example, composed of liquid crystals. The macro display control section 73 is so adapted that it receives the focal length information Zp and the focusing position information Sx, applies A/D conversion respectively to them and judges as to whether the variable power optical system 2 is in the variable power region or the focusing lens group 3 is at the nearest position as described above. Further, it receives the Zp and the defocusing amount (Dfx) outputted from the focal point detection section 70, decides the focusing (photographing) possible range relative to the Zp value and judges as to whether the defocus amount (Dfx) exceeds the focusing possible range or not. Further, it also stores the focusing direction signal (MDR) just before receiving the stop signal (LST) to the internal memory MR, compares the same with the content of the focusing direction signal (MDR) just after receiving the stop signal (LST). Then, if they agree with each other and when the contents thereof being $MDR=1$, the variable power optical system 2 is set to the variable power region and the defocusing amount Dfx does not exceed the focusing limit value Dfm, it causes the display 73a to display, for example, letters of "MACRO" indicating that the macro photographing is possible to the display 73a by the display signal (DSP) as the macro information (illustrated state). If these conditions are not satisfied, it outputs a display signal (DSP) indicating that the focusing is impossible thereby causing the display 73a to display letters or symbols indicating the content thereof. Even when the variable power optical system 2 is set to the variable power region and if the focus control section 71 outputs the stop signal (LST), if the focused state is attained in the variable power focusing region, it displays symbols or letters indicating that it is in the variable power region, for example, "ZOOM" as the ordinary display. A variable power control section 74 is adapted to set the variable power optical system 2 to an optional focal length in the variable power region by way of the variable power section 4, or drive under control the variable power optical system 2 to switch the variable optical system 2 to the variable power region or to the macro region upon receiving the switching control signal (CTL). Although not illustrated, the variable power control section 74 is adapted such that operation switches, for example, magnification ratio-up/-down switch for updating the entire system focal length in the variable region are connected and the operation of the section is started when the camera operator (user) actuates the switch from the outside. $+V$ means a power source and only main signals are shown for the input/output in each of the sections.

FIG. 8 is a cam diagram for controlling the focusing movement and the setting movement of the variable power optical system 2 in the embodiment according to the present invention as shown in FIG. 7.

In FIG. 8, are shown cam lines 95-99 respectively showing the setting movement of the first group lens 2a-fifth group lens 2e in FIG. 7 and, particularly, solid lines for the cam lines 95, 96 show $\infty$ positions. 95a and 96a are respectively cam lines showing the nearest position when the first group lens 2a and the second group lens 2b (that is, the focusing lens group 3) conduct focusing movement described above while maintaining the lens interval set upon the setting movement as it is.

There are also shown WIDE side 100a and the TELE side 100b respectively in the variable power region, a containing region $\theta_1$ for retracting the variable power optical system 2 into the camera main body when the camera is not used, balanced regions $\theta_2$ and $\theta_3$ in which the lens positions disposed on the WIDE side 100a and the TELE side 100b are not changed, the variable power region $\theta_4$ as described above, a region $\theta_5$ for moving to the macro region described above and a macro phtographing possible region $\theta_6$. While the cam lines 95–99 are shown as having different width respectively, each width shows the thickness of the lens and the lens moving amount is represented by the line on the left for each of the cam lines 95–99 in the drawing. Further, as can be seen from the descriptions made to FIG. 7, the distance between the cam lines 95 and 95a, and the interval between the cam lines 96 and 96a are equal to each other within the variable power region $\theta_4$. Further, the cam lines 97 and 99 are formed into a substantially equal configuration. Furthermore, each of the lens groups 2a–2e in the variable power optical system 2 is so constituted that the setting movement is conducted along the cam lines 95–99 accompanying with the rotation of the cylindrical cam frame (not illustrated) as $\theta_1$ and $\theta_4$, and $\theta_5$. Further, the balance regions $\theta_2$ and $\theta_3$ are such regions in which each of the lens groups 2a–2b are not movable as described above if the cam frame is rotated.

Furthermore, in this embodiment, f=135 mm on the TELE side, f=35 mm on the WIDE side, and the object distant D corresponding to the nearest position is: D=1.2 m. Then, the focused position changes relative to the change of the focal length information Zp and the change in the focused position is represented by a hyperbola function using Zp as a variant which is referred to as a focusing curve. The object distance D is used as a parameter in this focusing curve and the focusing curve with the object distance D=1.2 m (nearest position) is, particularly, defined as Fpc. The Fpc is determined while assuming the setting constants previously determined upon design of the variable power optical system 62 (including the parameters) as $C_1$, $C_2$ and $C_3$ respectively by the calculation equation:

$$F_{pc}=(C_2/(Zp+c1))+c3 \qquad (10)$$

Fpc is referred to hereinafter as the nearest end value.

Explanation will be made to the operation of this embodiment having thus been constituted referring to the flow chart shown in FIG. 9 but with respect to the difference from that shown in FIG. 1 and FIG. 4.

It is assumed here that the variable optical system 2 is in the variable power region $\theta_4$ in FIG. 8, the focusing lens group 3 is in the variable focusing region, for example, at the focal length: f=50 mm, the focusing lens group 3 is adjusted to the object distance: D=6.0 m and the object is situated, for example, at D=0.8 m (in macro photographing possible range 38) in FIG. 3.

When a release switch (not illustrated) is operated, the focal point detection section 70 at first starts the distance measuring operation to output the distance measuring data (Dfx) and (MDR). That is, it outputs the position for the object at D=0.8 m, i.e., MDR=1. Upon receiving MDR=1, the controller 71c of the focus control section 71 rotates the focus motor $M_F$ and starts to drive the focusing lens group 3 by way of the focusing drive section 5 toward the nearest side. Accompanying this, the focus counter 6 issues the output (Dfc) showing the moving amount of the focusing lens group 3. The focus control section 71 continuously monitors as to whether Dfc=Dfx or not. Then, the focusing lens group 3 reaches the nearest side end in the variable power focusing region and then stops upon abutting against the cam wall (not illustrated) at the nearest position. Accompanying this, the slit disk 6a in the focus counter 6 is also stopped and the focus control section 71 detects that there is no change in the output (Dfc) for a predetermined of time, to output the stop signal (LST). While on the hand, the macro display control section 13 stores therein the newest information by continuously writing the focusing direction signal (MDR) of the distance measuring data (Dfx) and (MDR) outputted from the focal point detection section 70 to the internal memory MR and prepares such that the data just before and just after the input of the stop signal (LST) described above can be compared.

Now, referring to the flow chart shown in FIG. 9, when the stop signal (LST) is outputted, the focus control section 71 stores the defocusing amount (Dfx) from the focal point detection section 70 to the defocus memory 71a while outputting the stop signal (LST). Then, the macro display control section 73 checks at the conditional branch "stop signal present ?", as to if the stop signal (LST) is inputted or not and, if it is inputted, compares the focusing direction signals (MDR) just before and just after the input of the stop signal (LST). In this case, since the object is situated on the side of the closest position 37 nearer than the nearest distance D=1.2 m to the camera, the signal just before outputting the stop signal (LST) is: MDR=1 and it is also MDR=1 just after the inputting since it has to be driven in the same direction. That is, since the stop signal (LST) is inputted and the focusing directions agree with each other, the flow is branched to YES. In a case if the conditions are not satisfied and the flow is branched to NO, letters showing that the variable power optical system 62 is in the variable power region, for example, "ZOOM" are displayed on the display 73 at the next "ordinary display" and all of the operations are ended at "END". Now, the macro display control section 73 checks the focusing direction signal (MDR) at the next conditional branch "nearest position ?", recognizes that the focusing direction is on the nearest side since MDR=1 as described above, further reads the focal length information Zp from ZPM 8, applies A/D conversion thereto and calculates the nearest end value Fpc for Zp by the equation (10) described above. Then, for determining the present position of the focusing lens group 3, it reads the focusing position information Sx from FPM 7 and applies A/D conversion thereto, determines the difference between the nearest end value Fpc and the information Sx and, if the difference is within a predetermined amount, judges that the focusing lens group 3 is at the nearest position, that is, it is on or extremely near the nearest focusing curve (not-illustrated), by which the flow is branched to YES. That is, in this conditional branch, it is confirmed that the variable power optical system 2 is in the variable power region and that the focusing lens group 3 reaches the nearest end of the variable power focusing region.

Since the preparation for the macro judgement as described above has thus been established, the macro display control section 13 checks as to whether the defocusing amount Dfx relative to the object situated at D=0.8 m is within the macro photographing possible range 38 or not in FIG. 3.

In this case, since the defocusing amount is within the macro photographing possible range 38, the flow is branched to YES at "focusing possible ?" and a display signal (DSP) indicating that the macro photographing is possible is outputted at the next "MACRO display" thereby causing the display 13a to display the letters of "MACRO".

Now, explanation is briefly made for the branch leading to the "focusing impossible display" not explained so far. Branching to NO at "nearest position ?" occurs if the focusing lens group 3 stops at the midway of the variable power focusing region, for example, by means of obstacles, etc. That is, since the focusing lens group 3 has not yet reached the nearest end, the macro display control section 13 judges it as the premiss for the macro judgement has not yet been prepared and outputs a display signal (DSP) indicating that the focusing is impossible. Then, upon receiving this output, the display 13a displays signals or letters indicating that the focusing is impossible (macro photographing impossible) and the operation of the macro judgement is completed at "END".

At the next conditional branch "focusing possible ?", in a case if the entire system focal length f is set near on the TELE side (Zp=0), for example, at the position shown by the symbol x in FIG. 3 even for an identical object distance D=0.8 m, since it is out of the macro photographing possible range 38, the flow is branched to NO to execute "focusing impossible display".

The operation of the macro judgement has thus been completed and the macro switching operation as the main portion of the present invention will be explained. The camera operator operates a macro switch 79a while observing the letters "MACRO" on the display 73a and recognizing that the focused state can surely be obtained by switching the setting of the variable power optical system 2 from the variable power region $\theta_4$ to the macro photographing possible region $\theta_5$. The flow chart shown in FIG. 9 is branched to YES at the conditional branch "macro switch ON ?" and the switching control section 72, receiving the start signal (STR), outputs a switching control signal (CTL) indicating that the focusing lens group 3 is at first moved to the ∞ position to the focusing control section 71 (controller 71c) at the next "focus lens group movement". The controller 71c, upon receiving the output, rotates the focus motor $M_F$ in the direction of driving the focusing lens group 3 toward the ∞ position and monitors the output Dfc from the focus counter 6. Then, when the focusing lens group 3 reaches the ∞ position, the controller 71c detects this by the output Dfc and stops the focusing motor $M_F$. Then, the switching control section 72 outputs a switching control signal (CTL) indicating that the variable power optical system 2 is switched to the macro region $\theta_5$ to the variable power control section 74. Upon receiving this signal, the variable power control section 72 rotates the variable power motor $M_Z$ in the direction of switching the variable power optical system 2 from the optical power variable region $\theta_4$ to the macro photographic possible region $\theta_6$ at "variable motor start". As a result, each of the lens groups 2a–2e conducts the setting movement as described above following after the shape of the cam lines 95–99 shown in FIG. 8. At the next conditional branch "macro region ?", it is checked as to whether the macro photographing possible region $\theta_6$ is reached or not and the flow is branched repeatedly to NO till the region is reached. Then, the flow is branched to YES when the predetermined focal length is reached and the variable power motor $M_Z$ is stopped at "variable power motor stop". That is, when "macro display" is executed, the focusing lens group 3 on the cam lines 95a and 96a shown by the broken lines in the variable power region $\theta_4$ in FIG. 8 moves onto the cam lines 95 and 96 (hatched lines on the left in the drawing) by "focusing lens group movement" described above and the variable power optical system 2 has just been switched from the variable power region $\theta_4$ to the macro photographing possible region $\theta_6$. Accordingly, the focusing lens group 3 is switched from the ∞ position to the macro position by the switching and the directionality is unified. Since the focusing direction signal is MDR=1 just after confirming the stop signal (LST) in the previous "stop signal present ?", and this means the driving direction from the side of the position to the side of the nearest position in the variable power focusing region and means the driving from the side of the macro ∞ position to the side of the nearest position, it can be recognized that the directionality has been unified. Then, since the directionality has thus been unified, the focusing control section 71 transfers the defocusing amount Dfx stored previously from the defocus memory 71a to the conversion section 71b and executes the calculation:

$$Dk = K_{11} \cdot Dfx \tag{11}$$

for converting the defocusing amount Dfx measured in the variable power focusing region into an intended focusing position Dk in the macro focusing region using the conversion constant $K_{11}$.

Then, the controller 71c rotates the focus motor $M_F$ in the direction of MDR=1 at the next "focus motor start" and then the flow is repeatedly branched to NO till the intended focusing position Dk and the output Dfc from the focus counter 66 agree with each other at the next conditional branch "Dfc=Dk ?". Then, the focusing lens group 3 moves to focus on the object at D=0.8 m and the flow is branched to YES at the instance when Dfc=Dk. Then, the controller 71c stops the focusing motor $M_F$ at "focusing motor stop". Then, the macro switching operation as described above is ended at "END".

As has been described above, since this embodiment is so adapted that macro information indicating that the macro photographing is possible is displayed and that the focusing lens group 3 is driven to the ∞ position in the variable power focusing region at first and then the variable power optical system 2 is switched to the macro region when the camera operator starts the operation of switching the variable power optical system 2 from the variable power region to the macro region, the driving directions are unified between the variable power focusing region and the macro focusing region to provide a merit that the focusing movement in the variable power focusing region and the focusing movement in the macro focusing region can be conducted by a common focus driving section.

Further, the judgement for the focusing in the macro focusing region is conducted not only by the output Dfx from the focus counter 6 but it may also be judged from the value of the focusing position information Sx from FPM 7 by adapting such that the focusing control section 71 can read the focus position information $S_x$. A merit capable of saving the focus counter 6 is obtained in this case.

Furthermore, the distance measuring data measured in the variable power focusing region is applied with the calculation: $Dk=k_{11} \cdot Dfx$ in the conversion section 71b after switching to the macro focusing region, which are used as the distance measuring data. It is naturally constituted such that the focusing control can be conducted based on the distance measuring data obtained by the distance measurement conducted again after switching to the macro focusing region.

FIG. 10 is a block diagram illustrating the entire constitution for the third embodiment. In FIG. 10, the same constituents as those of the device shown in FIG. 1 carry the same reference numerals and explanation will be made to the difference with respect to those in FIG. 1.

A region judging section 109 is disposed as the region judging means for receiving the focal length information Zp and the focus position information Sx respectively and applying A/D conversion thereto, judging as to whether the variable power optical system 2 is in the variable power region or in the macro region and outputting a negative signal (NG) if the system is not in the macro region. A focal point detection 110 is disposed as the focal point detection means for receiving the detect optical beams from an object (not illustrated) transmitting through the variable power optical system 2 and detecting the defocusing direction and the defocusing amount of the focused position of the object relative to an intended focusing position and it outputs the focusing direction signal indicating the driving of the focusing lens 3 toward the nearest position at MDR=1 and toward the position at MDR=−1 and the defocusing amount Dfx. They may sometimes be referred to collectively as distance measuring data.

A focus control section 111 is disposed for receiving the distance measuring data (Dfx) and (MDR) and the output (Dfc) from the focus counter 6 and driving under control the focusing lens group 3 to the focused position by way of the focus driving section 5, and it is so adapted to drive the focusing lens group 3 upon receiving the focusing direction signal (MDR), stop the driving for the focusing lens group 3 by detecting that the focusing lens group 3 is stopped at the end (or the midway) of the focusing region if there is no change in the output (Dfc) from the focus counter 6 for a predetermined of time during driving and also output a stop signal (LST). Further, the focus control section 111 is also adapted to judge that the focused position is reached when the output (Dfc) for the focus counter 6 and the defocusing amount (Dfx) agree with each other and stop the focusing motor $M_F$.

A variable power control section 112 is disposed for setting the variable power optical system 2 to an optional focal length in the variable power region by way of the variable power driving section 4, or change the system into the variable power region or the macro region upon receiving a switching control signal (CTL) described later. There are shown a macro display control section 113 and a display 113a, for example, composed of liquid crystals. The macro display control section 113 is so adapted that it receives the focal length information Zp and applies A/D conversion, determines the focusing (photographing) possible range to the Zp in the macro focusing region upon receiving the defocusing amount (Dfx) outputted from the focal point detection 110, judges as to whether the defocusing amount (Dfx) exceeds the focusing possible range or not, stores the focusing direction signal (MDR) just before receiving the stop signal (LST) into the internal memory MR, compares the signal with the content of the focusing direction signal (MDR) just after receiving the stop signal (LST) and, if they agree with each other and the content thereof is: MDR=1, the variable power optical system 2 is set to the variable power region, the defocusing amount Dfx does not exceed the focusing limit value Dfm and, further, no negative signal (NG) is inputted, causes the display 113a to display letters showing that the macro photographing is possible, for example, "MACRO" by the display signal (DSP). It is also adapted such that when the variable power optical system 2 is set to the variable power region described above and the focusing direction signals (MDR) just before and just after the output of the stop signal (LST) from the focusing control section 111 do not agree, it displays symbols or letters showing that it is in the variable power region, for example "ZOOM" (not-illustrated), etc. Switching actuation section 114 and 114a constitute the switching actuation means for actuating the macro switching operation of switching the setting for the variable power optical system 2 into the variable power region or the macro region, which comprises a macro switch 114a composed of a push button switch capable of external operation and the switching actuation section 114 as the switching actuation means for receiving the output from the macro switch 114a and outputting the start signal (STR) after determining the switching direction. A switching control section 115 is disposed as the switching control means for outputting a control signal GFL to the focusing control section 111 upon receiving the start signal (STR) from the switching actuation section 114 and, thereafter, outputting the switching control signal (CTL), to the variable power control section 112 and, if the negative signal (NG) is not inputted, switching the variable power optical system 102 to the macro region or the variable power region while monitoring the output from the ZPM 108. +V represents the power source and only the main signals are shown for the input/output for each of the sections.

FIG. 11 is a diagram for explaining each of the regions explained in FIG. 8 and respective focusing regions, in which the object distance D is taken on the abscissa, while the focal length f and fm are taken on the ordinate respectively. In FIG. 11, are shown a boundary line 144 corresponding to the TELE side 100b in FIG. 8 shown on the abscissa, a stop beginning line 145 corresponding to the stop position 100c, an end line 146 corresponding to the WIDE side 100b, a macro position line 147 corresponding to macro position 100d, a ∞ line 148 and a nearest line 149 showing the infinity and the nearest position of the object distance D respectively, and a closest line 150 showing the closest position of the object distance, for example, at D=0.5 m. Then, the region from the ∞ line 148 to the nearest line 149 corresponds to the variable power focusing region described above, while the region from the nearest line 149 to the closest line 150 corresponds to the macro focusing region. Further, as has been stated also with reference to FIG. 8, the region from the macro position line 147 to the boundary line 144 is a macro setting region $\theta_5$, while the region from the boundary line 144 to the end line 146 is the variable power region $\theta_4$. Further, the containing region $\theta_1$ and the balance regions $\theta_2$, $\theta_3$ have no direct concerns with the present invention and explanations therefor are omitted. Further, there is also shown a stop range 151 surrounded by both of the stop beginning line 145 and the end line 146 and both of the ∞ line 148 and the nearest line 149. Referring to the focal length information Zp, Zp =255 at the end line 146, Zp=140 at the stop beginning line 145 and, further, Zp is decreased as it approaches toward the boundary line 144.

Now, the operation of this embodiment having thus been constituted is to be explained referring to the flow chart shown in FIG. 12 but for the difference with respect to FIG. 1 and FIG. 4. It is assumed here that the variable power optical system 2 is in the variable power region, while the focusing lens group 3 is in the macro focusing region (on the macro position line 147). Then, when a camera operator operates the macro switch 114a, the start signal (STR) is outputted from the switching actuation section 114 and the flow chart is branched to YES at the first conditional branch "macro switch ON ?". Then, at the next conditional branch "within macro region?", the region judging section 109 reads the respective outputs (Zp) and (Sx) from ZPM 8 and FPM 7 respectively to check the present positions of the variable power optical system 2 and the focusing lens group 3. In this case, since the variable power optical system 2 and the focusing lens group 3 are situated to the macro region and the macro focusing region respectively, the region judging section 109 does not output the negative signal (NG) and the flow is branched to YES. In the case of branching to NO, the flow reaches "END" where the operation is ended. Then, upon receiving the start signal (STR), the switching control section 115 confirms that the negative signal (NG) is not outputted from the region judging section 109 and outputs a control signal (GFL) at the next "focusing lens group movement" as the preparation for the switching operation for unifying the driving directions for the focusing in the macro focusing region and the variable power focusing region. Upon receiving the control signal (GFL), the focusing control section 111 rotates the focus motor $M_F$ such that the focusing lens group 3 at the optional position in the macro focusing region is driven to the position on the nearest line 149 in FIG. 11. Then, the focus control section 111 judges that the focusing lens group 3 reaches the nearest line 149 if the output Dfc from the focus counter 6 is no more changed and stops the focus motor $M_F$. At the next "variable power motor start", the switching control section 115 outputs a switching control signal (CTL) for switching from the macro region to the variable power region. Upon receiving the output, the variable power control section 112 starts the variable power motor $M_Z$ to drive each of the lens groups 2a-2e and the ZPM 8. Referring now to the accompanying change of the variable power optical system 2 in conjunction with FIG. 11, the variable power optical system 2 on the macro position line 147 corresponding to the focal length: fm=80 mm in the macro region at first moves to the boundary line 144. Since the region judging section 109 outputs the negative signal (NG) from this instance indicating that the variable power optical system 2 is not in the macro region, the switching control section 115 confirms the negative signal (NG) at the next conditional branch "variable power region ?" and the flow is branched to YES. The switching control section 115 recognizing that the variable power optical system 2 has transferred to the variable power region in this way advances to the succeeding "ZP reading" and reads in the focal length information $Z_P$. The variable power motor $M_Z$ continues to rotate further and, as described above, since Zp=140 at the stop position 100c and the stop beginning line 145 in the variable power region, the switching control section 115 checks the change of Zp at the next conditional branch "Zp≧140 ?" and repeatedly branches to NO till the variable power optical system 2 reaches the stop beginning line 145. Then, when the variable power optical system 2 reaches Zp=140 corresponding to the focal length f=80 mm in the variable power region, the flow is branched at the conditional branch to YES. Then, in the next "variable power motor stop", it outputs the switching control signal (CTL) for stopping the variable power motor $M_Z$ and, upon receiving this, the variable power control section 112 stops the variable power motor $M_Z$ and all of the switching operations are completed when reaching "END". Now, at the instance when the variable power optical system 2 has thus been switched from the macro region to the variable power region, the focusing lens group 3 is situated on the ∞ line 148. That is, it is stated in FIG. 11 in view of the explanation that the focusing region is divided into two regions, i.e., the variable power focusing region and the macro focusing region corresponding to that the object distance is continuous they are continuous regions. However, as can be seen from the description for FIGS. 10 and 8, there is only one mechanical movable region for the focusing lens group 3 and this corresponds, in FIG. 11, to overlap the variable power focusing region and the macro focusing region. Accordingly, assuming a linear line which is brought into contact in parallel with the nearest line 149 on the side of the macro focusing region, as a macro ∞ line, the macro ∞ line overlaps with the ∞ line 148 and, since the closest line 150 is overlapped with nearest line 149, it has been stated that the focusing lens group 3 is driven up to the nearest line 148 and then stopped referring to "focusing lens group movement". However, the focusing group lens 3 situates on the ∞ line 148 just after the switching of the variable power optical system 2 from the macro region to the variable power region, not movably as it is when viewed from the movable region as described above.

Under this state, that is, the variable power optical system 2 is on the stop beginning line 145, focusing lens 3 is on the ∞ line 148 and the object situates on the side of the variable power focusing region slightly to the nearest line 149 at D=1.2 m (D=1.3 m), if the release switch (not illustrated) is operated to start the measuring operation, the focal point detection section 110 conducts the first distance measurement to output the defocusing amount Dfx and the focusing direction signal MDR=1 as the distance measuring data. It is assumed here that the distance measuring data contain scattering and the defocusing amount Dfx is corresponded to D=1.1 m. Upon receiving the focusing direction signal (MDR), the focusing control section 111 rotates the focus motor $M_F$ such that the focusing lens group 3 is driven from the ∞ line 148 to the position corresponding to D=1.1 m on the nearest line 149. Then, the focusing lens group 3 reaches the nearest line 149 and then stops upon abutting against the wall of a cam (not illustrated). Then, the focusing control section 111 outputs the stop signal (LST) detecting that the output Dfc from the focus counter 6 is no more changed. Then, the focal point detection section 110 conducts the second distance measurement and outputs the defocusing amount Dfx corresponding to D=1.3 m and the focusing direction signal MDR=−1. That is, while distance measurement was conducted for the object on the nearest line 149 by the focusing lens group 3 at the lens position corresponding to the ∞ line 148 for the first distance measurement, distance measurement is conducted at the lens position in which the focal lens group 3 is at D=1.2 m which is extremely near to the focusing position (D=1.3 m) for the second distance measurement. Accordingly, no scattering is resulted within the range of f=35—80 mm since the focal depth is deep. Then, since the focusing direction is opposite to that in the first process, MDR= −1. Accordingly, since the focusing direction signals just before and just after inputting the stop signal (LST), that is, the focusing direction signals in the distance measurement for the first and the second times do not agree with each other and the object distance D=1.3 m is within the variable power focusing region, letters "ZOOM" are displayed on the display 113a. As a result, the operator can be free from confusion by such indication as "MACRO" for demanding the switching to the macro region again after the macro region has once been switched to the variable power region.

As has been described above, according to this embodiment, since the variable power optical system 2 is set at the focal length: f=80 mm within the variable power region that substantially agrees with the focal length fm=80 mm in the macro position 100d upon switching from the macro region to the variable power region, a merit that the angle of view is not changed, which gives natural feeling to human eyes. In addition, since it is set within the focal length f=35—80 mm in the variable power region where the scattering of the distance measuring data is observed within the focal depth, there is also a merit that the operator is not disturbed by the erroneous operation due to the scattering of the distance measuring data.

Although the stop beginning line 145 is desirably at f=80 mm, it is not restricted only thereto but it may be optionally chosen within a stop range 151. That is, it may optionally be set within a range of the focal length f=35—80 mm in the variable power region.

Further, the nearest line 149 is not restricted to a distance corresponding to D=1.2 m but the distance may be increased or decreased so long as it is appropriate in view of the specification for the camera.

Furthermore, the focal length information Zp corresponding to the focal length f=80 mm in the variable power region is not restricted only to Zp=140 but it may be increased or decreased so long as it is an appropriate amount for the constitution of the variable power driving section 104.

FIG. 13 is a block diagram illustrating the entire constitution for a further preferred embodiment of a camera display device according to the present invention.

In FIG. 13, the same constituents as those of the device shown in FIG. 1 carry the same reference numerals and explanation will be made for the difference with respect to those in the device shown in FIG. 1.

In FIG. 13, a region judging section 169 is disposed as region judging means for receiving the focal length information Zp and the focus position information Sx and applying A/D conversion thereto respectively, calculating the shifting amount (protruding amount) of the focusing lens group 3 from the ∞ position to the nearest position in Zp up to an intended focused position, judging whether the photographing lenses 2 are in the variable power region or in the macro region while detecting the present position of the focusing lens group 3 based on the Sx above and outputting a negative signal (NG) if the lens group is not in the variable power region. A focal point detection section 170 is disposed as the focal point detection means for receiving optical beams from the object (not illustrated) transmitting through the photographing lenses 2 and detecting the defocusing direction and the defocusing amount of the focused position of the object relative to the intended focused position and it outputs a focusing direction signal indicating the driving of the focusing lens group 3 toward the nearest position at MDR=1 and toward the ∞ position at MDR=−1 and a defocusing amount Dfx. The focusing direction signal (MDR) and defocusing signal (Dfx) may sometimes be referred to hereinafter collectively as the distance measuring data. Further, the focal point detection section 170 is also adapted so as to form the distance measuring data by the correlationship method using, for example, a CCD as the photoreceiving device. The defocusing amount is Dfx, focused state is Dfx=0 and the maximum defocusing amount if Dfx=2,048.

A focus control section 171 is disposed as the focus driving and control means for receiving the distance measuring data (Dfx), (MDR) and the output (Dfc) from the focus counter 166 and driving under control the focusing lens group 3 to the focused position by way of the focus driving section 5, and also so adapted that it drives the focusing lens group 3 upon receiving the focusing direction signal (MDR) and stops the driving for the focusing lens group 3 by detecting that the focusing lens group 3 is stopped at the end (or midway) of the focusing region if the output (Dfc) from the focus counter 6 shows no changes for a predetermined of time during driving and outputs the stop signal (LST). The focus control section 171 is also adapted to judge the focused position when the output (Dfc) from the focus counter 6 and the defocus amount (Dfx) agree with each other and stop the focus motor M$_F$. A lens judging section 172 is disposed as the lens judging means for reading the combination of electrical contacts showing the type of lens including the macro function previously disposed to the photographing lenses 2, judging whether the photographing lenses 2 have the macro function or not and outputting a macro signal (MC) in a case if it has the macro function.

There are also shown a macro display control section 173a and a display 173b as the promotion information providing means 173. The macro display control section 173a is adapted to receive the distance measuring data, stop signal (LST), macro signal (MC), focal length information Zp and negative signal (NG), conduct the macro judgement for judging whether the macro photographing is possible or not based on these conditions and the calculation and output the display signal (DSP) indicating that the macro photographing is possible if it is so. A display 173b is composed, for example, of liquid crystals, receives the display signal (DSP) and display those letters such as "MACRO", for example, shown in the Figure as the promotion information. The macro display control section 173a is adapted to continuously store the focusing direction signals (MDR) just before the input of the stop signal (LST) to the internal memory MR so that the contents of the focusing direction signals (MDR) just before and just after the input of the stop signal (LST) can be compared. Further, the display 173b is so adapted that it displays the letters indicating the variable power region, for example, "ZOOM" and letters or symbols indicating that the macro photographing is impossible depending on the content of the display signal (DSP). A variable power control section 174 is disposed as the variable power control means for driving under control the variable power optical system 2 such that the variable power optical system (photographing lens) 2 is set to the optional focal length in the variable power region or to a predetermined focal length in the macro region by way of the variable power driving section 164. The operation of the variable power control section 174 is so adapted to be started by the external operation of a camera user (operator) to operation switches, for example, magnification ratio - up/down switch and variable power/macro switching switch, etc. although not illustrated. +V represents the power source and only main signals are shown for input/output in each of the sections.

FIG. 14 is a diagram showing the characteristics of the device according to the present invention shown in FIG. 13 in the macro region like that in FIG. 2, particularly, for explaining the photographing possible range, that is, the focusing possible range in the macro region. In FIG. 14, the ordinate indicates similarly as the ordinate in FIG. 2, in which $Zp=0$ shows the value of $Zp$ corresponding to the TELE side, $Zp=Zp(1)$ and $Zp=Zp(2)$ are the value for the $Zp$ determining the limit for the focusing possible range described later and $Zp=255$ shows the value for $Zp$ corresponding to the WIDE side. The abscissa shows the object distance D corresponding to the focus position information Sx on the basis of the object distance $D=1.2$ m corresponding to the nearest position as the standard. In the figure, there are shown a reference line 201 indicated by the linear line at $D=1.2$ m constituting the standard, the closest contact line 202 indicated by the linear line (dotted line in the drawing) at $D=0.4$ m and showing the object distance nearest to the camera, a maximum defocus curve 203 showing the maximum defocusing amount capable of distance measurement on the film, a limit curve 204 defined with a predetermined margin for eliminating the effect such as actual errors, each of the intersections 205, 206 and 207 between the line: $Zp=0$ and the standard line 201, the maximum defocusing curve 203 and the limit curve 204 successively, and intersection 208 between the maximum defocus curve 203 and the limit curve 204 which corresponds to $Zp=Zp(1)$, intersection 209 between the maximum defocus curve 203 and the closest contact line 202 corresponding to $Zp=Zp(2)$, an intersection 210 on the limit curve 204 corresponding to $Zp=Zp(2)$, an approximate limit line 211 indicated by the dotted chain prepared by approximating the section of the limit line 204 between $Zp=Zp(1)-Zp=Zp(2)$ with a linear line, each of intersections 212–217 on the linear line shown by $Zp=255$, that is, the intersection 212 with the focusing curve 195 at the position, the intersection 213 with the standard line 201, the intersection 214 between the limit curve 204 and the approximate limit line 211, intersections 215 and 216 with perpendiculars from the intersections 210 and 208 respectively and the intersection 217 with the nearest contact line 202. The intersections 212 and 213 are identical with the ∞ position and the nearest position in FIG. 2, and the intersection 217 may sometimes be referred to as "closest position". A macro photographing (focusing) possible range 218 denotes a range surrounded with both of the lines $Zp=0$ and $Zp=255$, the reference line 201, the maximum defocusing curve 203 from the intersection 206 to the intersection 208 and the approximate limit line 211. The range from the focusing curve 195 at the ∞ position to the standard line 201 is the variable power focusing region, while the range from the standard line 201 to the closest contact line 202 is the macro focusing region.

FIG. 15 is a flow chart illustrating the operation sequence for the embodiment shown in FIG. 13.

Now, the operation of this embodiment having thus been constituted is to be explained referring to the flow chart shown in FIG. 15 but for the difference with respect to the explanations for FIG. 1 and FIG. 4. It is assumed here that the focusing lens group 163 is in the variable power focusing region, the focal length is at $f=50$ mm ($Zp=217$), the focusing lens group 163 is on the focusing curve 16 corresponding to the object distance $D=6.0$ m, and the object situates at $D=0.8$ m in FIG. 3, (within the macro photographing possible range 218). Further, the photographing lens 162 has the macro function as described above.

When a release switch (not illustrated) for starting the photographing operation or the distance measuring operation constituting a part of the photographing operation is operated, the focal detection section 170 at first starts the distance measuring operation to output the distance measuring data (Dfx) and (MDR). That is, it outputs the defocusing signal (Dfx) corresponding to the object distance $D=0.8$ m, for example, defocusing amount $Dfx=980$ and, since this is the driving toward the nearest side, it outputs $MDR=1$ as the focusing direction signal (MDR). Upon receiving $MDR=1$, the focus control section 171 rotates the focus motor $M_F$ and starts to drive it toward the nearest side. Along with this driving, an output (Dfc) showing the moving amount of the focusing lens group 3 is outputted from the focus counter 6. The focus control section 171 continuously monitors as to whether $Dfc=Dfx$ or not. In FIG. 2, the focusing lens group 3 at the intersection between the focusing curve 16 and $f=50$ mm moves on the line: $f=50$ mm, successively passes the intersections with the focusing curves 17, 18, 19 and then reaches the intersection with the nearest focusing curve 20. That is, the focusing lens group 3 reaches the end on the nearest side in the variable power focusing region, abuts against the cam wall (not illustrated) at the nearest position and stops. Correspondingly, the slit disk 6a of the focus counter 6 is also stopped and the focus control section 171 detects that there is no change in the output (Dfc) for a predetermined of time and outputs the stop signal (LST). While on the other hand, the macro display control section 173a writes the focusing direction signal (MDR) of the distance measuring data (Dfx) and (MDR) outputted from the focal point detection section 170 sequentially to the internal memory MR to store the newest information, and prepares so that the data just before and just after the input of the stop signal (LST) can be compared. Further, the lens judging section 172 reads electrical contacts (not illustrated) disposed to the photographing lenses 2 and outputs a macro signal (MC) since it has the macro function.

Now, referring to the flow chart in FIG. 15, the macro display control section 173a at first checks the absence or the presence of the stop signal (LST) at the conditional branch "stop signal presents ?" and, since the stop signal (LST) has already been outputted as described above, the flow is branched to YES. At the conditional branch "focusing direction agree ?", the macro display control section 173a compares the focusing direction signals (MDR) just before and just after the input of the stop signal (LST) as described above. In this case, since the object is situated on the side of D=0.8 m (217 in FIG. 14) nearer to the camera than the nearest position D=1.2 m, the signal is: MDR=1 just before the output of the stop signal (LST) and also MDR=1 just after thereof since the driving has to be conducted in the same direction. That is, since the focusing directions agree with each other, the flow is branched to YES. If the flow is branched to NO in these two conditional branches, those letters illustrating that the photographing lenses 162 are in the variable power region, for example, ZOOM are displayed on the display 173b at the next "ordinary display" and all of the operations are completed at "END". Then, at the next conditional branch "focusing direction on the nearest side ?", the focusing direction signal (MDR) is checked and, since MDR=1 as described above, the flow is branched to YES. Then, at the next conditional branch "macro lens ?", the macro display control section 173a checks the absence or the presence of the macro signal (MC) and, since the macro signal (MC) has already been outputted as described above, the flow is branched to YES. Then, at the next "Zp reading", the macro display control section 173a reads the focal length information Zp from ZPM 8 applies A/D conversion thereto, and calculates the nearest end value Fpc at this Zp value at the next "nearest end value calculation". At the next conditional branch "lens at nearest position ?", the region judging section 169 reads the focus position information Fx from the FPM 7, applies A/D conversion thereto for recognizing the present position of the focusing lens group 3, then determines the difference between Sx and the nearest end value Fpc. If the difference is within a predetermined amount, it judges that the focusing lens group 3 is at the nearest position, that is, on or extremely near the focusing curve shown in FIG. 2 and the flow is branched to YES. That is, at this conditional branch, it is confirmed that the photographing lenses 2 are in the variable power region and the focusing lens group 3 reaches the nearest end of the variable power focusing region.

Now, the preparation for the macro judgement for judging as to whether the macro photographing is possible or not has thus been established. Explanation will then be made to the operation of the macro judgement as the principal portion thereof. At the next conditional branch "focusing possible ?", it judges as to which of the maximum defocusing curve 203 or the approximate limit line 211 is used for determining the practical limit of the macro photographing possible range 218. That is, the macro display control section 173a determines the limit by the maximum defocusing curve 203 if the value Zp is within a range (i) where $0 \leq Zp < Zp(1)$, whereas determines the limit by the approximate limit line 211 if Zp is within the range (ii) where $Zp(1) \leq Zp \leq 255$. In this case, since the photographing lenses 2 are at the focal length f=50 mm and the focal length information Zp=217, Zp is within the range (ii) above, assuming the function L(Zp) representing the approximate limit line 211 for example as $L(Zp)=13 \times Zp - 1350$, it calculates as $L(Zp)=13 \times 217 - 1350 = 1471$ and determines the focusing limit value as Dfm=1471. Then, it compares the focusing limit value Dfm=1471 with the defocusing amount: Dfx=930 outputted from the focal point detection section 170 and, since the defocusing amount Dfx does not exceed the focusing limit value Dfm, it judges that the focused state can surely be obtained by moving the focusing lens group 3 to the macro focusing region and the flow is branched to YES. Accordingly, at the next "MACRO display", since the macro display control section 173a has judged that the macro photographing is possible, it outputs the display signal (DSP) indicating this to the display 173b thereby causing the display 173b to display letters "MACRO" shown in FIG. 13. Then, the operation for the macro judgement is ended at "END".

Now, explanation will be made to a case where Zp is within the range (i) described above. This corresponds to the case where the entire focal length f=50 mm in the foregoing explanation is, for example, at f=90 mm (Zp=115). In this case, the focusing limit value Dfm is fixedly determined as "Dfm=2048". Referring to FIG. 14, this means that the bounrady for the macro photographing possible range 218 within the range (i) is determined by the maximum defocusing curve 203. The value 2048 means the defocusing amount Dfx capable of distance measurement outputted from the focal point detection section 170 also as described above. Then, assuming the object distance as: D=0.8 m, since the defocusing amount Dfx=930 as described above and, accordingly, it is smaller than Dfm=2048, the flow is branched to YES at the conditional branch "focusing possible ?" and then the operation of the macro judgement goes through "MACRO display" and then ended at "END".

Now at the conditional branch "focusing possible" described above, in a case where the entire system focal length f is set near the TELE side (Zp=0), for example, at the position indicated by the symbol x in FIG. 14 even for the identical object distance D=0.8 m, since it is out of the macro photographing possible range 38, the flow is branched and advances to "focusing impossible display". That is, the macro display control section 173a judges it as focusing impossible and outputs the display signal (DSP) indicating the focusing impossible. Then, the display 173b, upon receiving the output, displays signals or letters indicating the focusing impossible (macro photographing impossible) and the operation of the macro judgement is ended at "END".

By the way, explanation will be made briefly to two branches leading to the "focusing impossible display" not explained so far.

Referring to the branching to NO at "macro lens ?", there is no requirement for executing the macro judgement since the photographing lens 2 has no macro function. Then, the branching to N at the "lens at nearest position ?" occurs in a case where the focusing lens group 3 is stopped at the midway of the variable power focusing region, for example by an obstacle or the like. That is, since the focusing lens group 163 has not yet reached the end on the nearest side, the macro display control section 173 judges that the premiss for the macro judgement has not yet been prepared and executes the foregoing "focusing impossible display".

According to this embodiment having thus been constituted, since the portion corresponding to the distance between the intersections 209 and 210 is set, for example, to Zp=Zp(2) as the margin upon forming the macro photographing possible range 218, there is a merit that the accuracy and the reliability of the macro judgement are high. Accordingly, it can provide a merit that there is no reduction in the distance measuring accuracy on the WIDE side.

Further, in the range (ii) of the focal length information Zp, the macro photographing possible range 218 may be determined not using the approximate limit line 211 but using the limit curve 204 if there is no problem in the reduction of the calculation speed. Further, the function L(Zp) is not limited only to L(Zp)=13×Zp−1350 but it may be varied in view of the design for the photographing lens 162.

Also in this embodiment, the promotion information is not restricted only to the display on the display 173b but sound or voice may be used. In short, any of those means can be used so long as they can be recognized by the user.

Furthermore, the number of focusing lens group is not necessarily limited to the 2-group constitution and the number of the groups may be increased or decreased if it is required in view of the design of the variable power optical system 2. Furthermore, it is applicable not only to the front focusing system but also to the inner focusing system or rear focusing system.

What is claimed is:

1. An automatic focusing device for use in a camera using photographic lenses having a variable power region in which an entire focal length of a variable power optical system comprising a variable power lens group, a focusing lens group and a macro lens group disposed on an identical optical axis can optionally be set by the variable power lens group between a shortest focal length and a longest focal length and a macro region capable of macro photographing by the macro lens group, as well as having, as a focusing region of the focusing lens group, a variable power focusing region from an infinite position to a nearest position on the optical axis corresponding to an object distance from an infinite distance to a nearest distance and a macro focusing region capable of macro photographing in a predetermined region disposed from the nearest position on a side opposite to the infinite position, the device comprising:
    a focal point detection means for receiving light from an object transmitting through the photographic lenses and detecting a defocusing direction and a defocusing amount for a focused position of an object relative to an intended focal point position,
    a region judging means for judging as to whether the variable power optical system is in the variable power region or in the macro region,
    a focal length detection means for outputting a focal length information corresponding to an entire system focal length when the variable power lens group is in the variable power region,
    a focusing drive control means for driving the focusing lens group, detecting that the focusing lens group has been driven to end of the variable power focusing region and then stopping a driving for the focusing lens group,
    a macro information providing means for providing a camera operator with an operation promotion information so that the variable power optical system is shifted to a macro photographing possible state when the focusing lens group is driven to end in the variable power focusing region, the defocusing directions just before the driving is stopped or just after the driving is stopped by the focusing drive control means respectively are identical with each other and the defocusing direction is directed to the nearest position and
    a judging indication means for calculating a macro photographing possible range to the entire system focal length set by a focal length information and the defocusing amount, judging as to whether the operation promotion information should be provided or not and then indicating this to the macro information providing means.

2. An automatic focal point adjusting device including photographing lenses having a variable power region and a macro region capable of macro photographing, a focal point detection means for receiving light from an object to be focused transmitting through the photographing lenses and detecting a deviating direction of a focused position of the object relative to an intended focal point position and a focused state of the object to be focused and driving means for starting a movement of a focusing lens of the photographing lenses toward a focusing direction when a not-focused state is judged by the focal point detection means and stopping a movement when the focused state is judged, the device comprising:
    an end detection means for detecting as to whether a driving position of the focusing lens of the photographing lenses has reached end of a driving range in the variable power region or not,
    an inhibition means for inhibiting an operation of the driving means when end is detected by the end detection means,
    a releasing means for responding to end detection in the end detection means, comparing data of deviating directions from the focal point detection means just before and just after detection and releasing an inhibiting operation of the inhibiting means if both of directions do not agree with each other,
    a region judging means for judging as to whether the photographing lenses are situated in the macro region or not and
    a macro information providing means for responding to end detection from the end detection means when it is judged that the photographing lenses are not situated in the macro region by the region judging means, comparing driving directions of the focusing lens obtained from the focal point detection means just before and just after detecting and outputting a promotion information indicating that the photographing lenses should be shifted into the macro region if both of directions agree with each other and the driving direction is toward a nearest position.

3. An automatic focusing device for use in a camera using photographic lenses having a variable power region in which an entire focal length of a variable power optical system comprising a variable power lens group, a focusing lens group and a macro lens group disposed on an identical optical axis can optionally be set by the variable power lens group between a shortest focal length and a longest focal length and a macro region capable of macro photographing by the macro lens group, as well as having, as a focusing region of the focusing lens group, a variable power focusing region from a infinite position to a nearest position on the optical axis corresponding to an object distance from an infinite distance to a nearest distance and a macro focusing region capable of macro photographing which is present substantially overlapped with the variable power focusing region, the device comprising:
    a macro information providing means for judging as to whether a focusing in the macro focusing region is possible or not if the variable power optical system is switched to the macro region in a case where the variable power optical system is in the variable power region and a focused state can not be attained even after the focusing lens group has reached the nearest position of the variable power focusing region and informing the result thereof to a camera operator as macro information, a variable power driving means for setting the variable power optical system to the variable power region or to the macro region and driving the variable power lens group for setting it to an optional entire system focal length in the variable power region, a focusing drive means for driving the focusing lens group, a switching actuation means capable of external operation for actuating a macro switching operation of switching the variable power optical system from the variable power region to the macro region, a switching control means for controlling the variable power driving means and the focusing driving means so that macro switching operation can be made while maintaining a predetermined relative positional relationship or a predetermined time relationship between the variable power lens group and the focusing lens group from an instance that a camera operator informed with a macro information indicating that a focusing is possible actuates the switching actuation means, a focusing lens group position detection means for detecting a position of the focusing lens group on the optical axis in the macro focusing region, a focal point detection means for receiving light from the object passing through the photographing lenses and detecting a defocusing amount of a focused position of the object relative to an intended focused position, a defocusing amount memory means for storing the defocusing amount at an instance informed with the macro information and a defocusing amount conversion means for converting the defocusing amount stored in the defocusing amount memory means into an intended focused position in the macro focusing region.

4. A variable power optical system control device for use in a camera using photographic lenses having a variable power region in which an entire focal length of a variable power optical system comprising a variable power lens group, a focusing lens group and a macro lens group disposed on an identical optical axis can optionally be set by the variable power lens group between a shortest focal length and a longest focal length and a macro region capable of macro photographing by the macro lens group, as well as having, as a focusing region of the focusing lens group, a variable power focusing region from an infinite position to a nearest position on the optical axis corresponding to an object distance from an infinite distance to a nearest distance and a macro focusing region capable of macro photographing, which is present substantially overlapped with the variable power focusing region, the device comprising:

a lens group driving means for setting the variable power optical system to the variable power region or to the macro region and driving the variable power lens group or the macro lens group for setting an entire system focal length in both of the regions, a region judging means for judging as to whether the variable power optical system is set in the macro region or in the variable power region, a focal length detection means for outputting focal length information corresponding to the entire system focal length when the variable power optical system is set to the variable power region, a switching actuation means capable of external operation for actuating a switching operation of switching a setting for the variable power optical system to the variable power region or to the macro region and switching control means for controlling the lens group driving means based on a focal length information when a switching operation to the variable power region is actuated by the switching actuation means in a state where the variable power optical system is set to a predetermined focal length in the macro region so that the entire system focal length in the variable power region is set substantially equal with or shorter than a predetermined focal length.

5. A display device for use in a camera using, as photographic lenses, such vari-focus lenses as having at least a variable power region in which an entire focal length of a variable power optical system comprising at least a variable power lens group and a focusing lens group disposed on an identical optical axis can optionally be set by the variable power lens group between a shortest focal length and a longest focal length, as well as having, as a focusing region of the focusing lens group, a variable power focusing region from an infinite position to a nearest position on the optical axis corresponding to an object distance from a infinite distance to a nearest distance, the device comprising:

a lens judging means for judging as to whether photographing lenses mounted to the camera are photographing lenses having a macro function capable of macro photographing or not, a region judging mans for judging as to whether the photographing lenses are set to the macro region or not, a focal point detection means for receiving light from the object transmitting through the photographing lenses, detecting a deviating direction and a focused state of a focused position relative to an intended focused position of the object and outputting them as distance measuring information and a promotion information providing means for providing a promotion information calling the camera operator's attention to that the photographing lenses are moved to the macro region when it is judged by the lens judging means that the photographing lenses have a macro function and also judged by the region judging means that the photographing lenses are not in the macro region in response to a distance measuring information indicating that the object is present at a position nearer to the nearest position.

* * * * *